(12) United States Patent
Soliman et al.

(10) Patent No.: US 11,920,720 B2
(45) Date of Patent: Mar. 5, 2024

(54) SYSTEM AND METHOD FOR MITIGATING WATER HAMMER BY LOOPING SURGE PRESSURE

(71) Applicant: Saudi Arabian Oil Company, Dhahran (SA)

(72) Inventors: Mohamed Ahmed Soliman, Ras Tanura (SA); Ali Hamoud Hassan Alshehri, Tanajib (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 118 days.

(21) Appl. No.: 17/321,043

(22) Filed: May 14, 2021

(65) Prior Publication Data
US 2022/0364668 A1    Nov. 17, 2022

(51) Int. Cl.
*F16L 55/055* (2006.01)
*F16K 17/196* (2006.01)
(Continued)

(52) U.S. Cl.
CPC .......... *F16L 55/055* (2013.01); *F16K 17/196* (2013.01); *F16L 55/045* (2013.01);
(Continued)

(58) Field of Classification Search
CPC ... B60K 2015/03296; F16D 2048/0215; F17D 1/20; Y10T 137/2574; Y10T 137/7771;
(Continued)

(56) References Cited

U.S. PATENT DOCUMENTS 3,911,941 A    10/1975  Gerbic et al.
4,044,791 A *   8/1977  McKenzie .............. F16K 17/18
                                                137/513.3
(Continued)

FOREIGN PATENT DOCUMENTS

CA    2990241 A1    6/2018
CN    203516869 U *  4/2014
(Continued)

OTHER PUBLICATIONS

Saudi Arabian Examination Report, Application No. 122431041, dated Dec. 14, 2022.
(Continued)

*Primary Examiner* — Robert K Arundale
*Assistant Examiner* — Richard K. Durden
(74) *Attorney, Agent, or Firm* — Bracewell LLP; Constance G. Rhebergen; Keith R. Derrington

(57) ABSTRACT

A water hammer mitigation system includes a branch connection with ends coupled to a main pipeline, where a first end connects at a surge point on the main pipeline and a second end fluidly connects to the main pipeline at a distal point. A bi-directional surge relief device is disposed on the branch connection, and is operable to move to a first open configuration to permit pipeline fluid within the main pipeline to flow through the branch connection when surge point pressure reaches a designated pressure. The device can also move to a second open configuration when surge point pressure reaches another designated pressure. The device is closeable when surge point pressure is between the designated pressures.

12 Claims, 9 Drawing Sheets

(51) Int. Cl.
*F16L 55/045* (2006.01)
*F17D 1/20* (2006.01)
*E03B 7/07* (2006.01)
*F16K 15/06* (2006.01)
*F16K 17/18* (2006.01)

(52) U.S. Cl.
CPC ............. *F17D 1/20* (2013.01); *E03B 7/075* (2013.01); *F16K 15/066* (2013.01); *F16K 17/18* (2013.01)

(58) Field of Classification Search
CPC ......... Y10T 137/7777; Y10T 137/7779; Y10T 137/778; Y10T 137/7838; Y10T 137/7932
See application file for complete search history.

(56) References Cited

U.S. PATENT DOCUMENTS

| | | | |
|---|---|---|---|
| 4,261,387 A | | 4/1981 | Cohn |
| 4,340,079 A | | 7/1982 | Smith et al. |
| 4,612,766 A | * | 9/1986 | Eder .................... F02C 7/22 |
| | | | 60/764 |
| 5,048,561 A | | 9/1991 | Taplin et al. |
| 5,960,822 A | * | 10/1999 | Matuschka ........... F15B 13/027 |
| | | | 137/515.7 |
| 6,470,909 B2 | * | 10/2002 | Osterlanger ......... F16K 15/026 |
| | | | 137/514.3 |
| 7,284,563 B2 | | 10/2007 | Partridge et al. |
| 7,513,111 B2 | | 4/2009 | Daigre |
| 9,127,684 B2 | | 9/2015 | Galeotti |
| 9,567,996 B2 | | 2/2017 | Chatfield et al. |
| 10,174,875 B2 | | 1/2019 | Shade |
| 10,590,758 B2 | | 3/2020 | Shampine et al. |
| 2005/0005969 A1 | * | 1/2005 | Wu ....................... F16L 55/043 |
| | | | 137/205.5 |
| 2009/0152871 A1 | | 6/2009 | Ching |
| 2014/0166115 A1 | * | 6/2014 | Yang .................... F16L 55/045 |
| | | | 137/12 |
| 2015/0211641 A1 | * | 7/2015 | Pacht .................... F04B 1/145 |
| | | | 251/359 |

FOREIGN PATENT DOCUMENTS

| | | |
|---|---|---|
| CN | 204781108 U | 11/2015 |
| CN | 106050776 A * | 10/2016 |
| CN | 112228684 A * | 1/2021 |
| DE | 102013003099 A1 | 8/2014 |
| KR | 200160606 Y1 * | 11/1999 |
| KR | 20080016082 A * | 2/2008 |

OTHER PUBLICATIONS

Al Smiley, "Ways to Reduce Hydraulic Shock", Machinery Lubrication, GPM Hydraulic Consulting, Dec. 11, 2020, 11 pages.
Google patent English Translation of DE102013003099, Anmelder Gleich, Published Aug. 28, 2014, 7 pages.
Mokveld, "Surge Relief Valves", Mokveld Valves BV, 12 pages.
Water World, "Damage Control: Avoiding Destructive Water Hammer Conditions", Apr. 7, 2014, 10 pages.

* cited by examiner

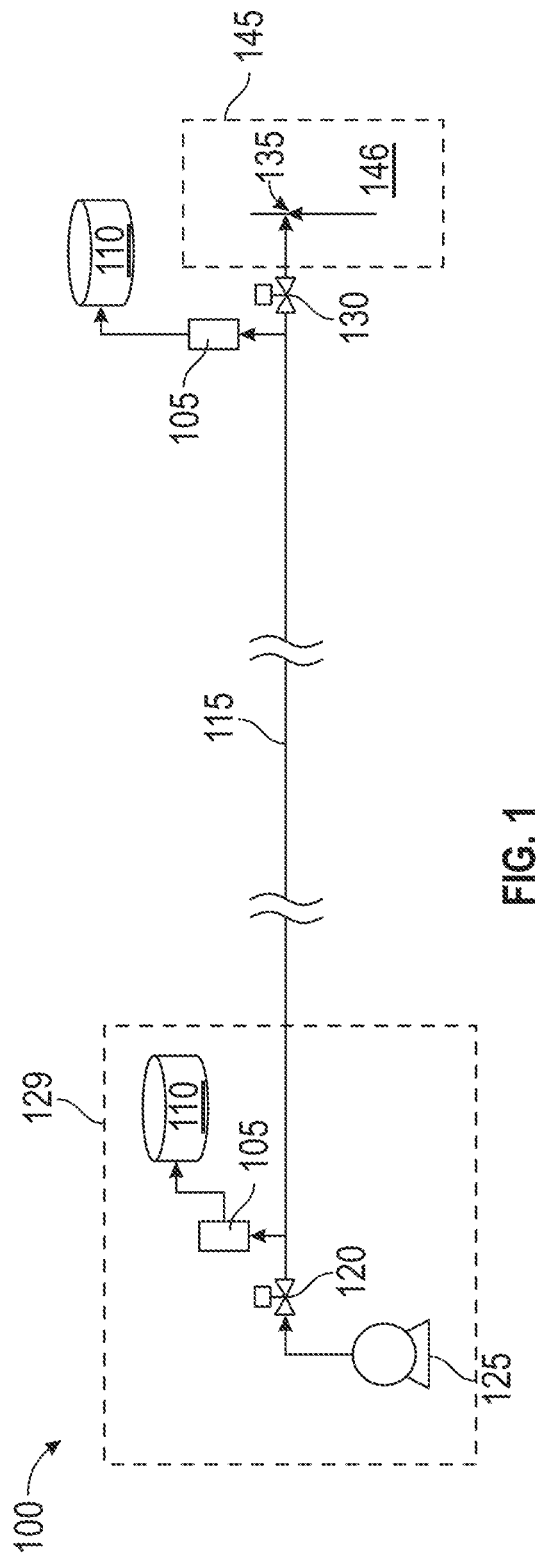
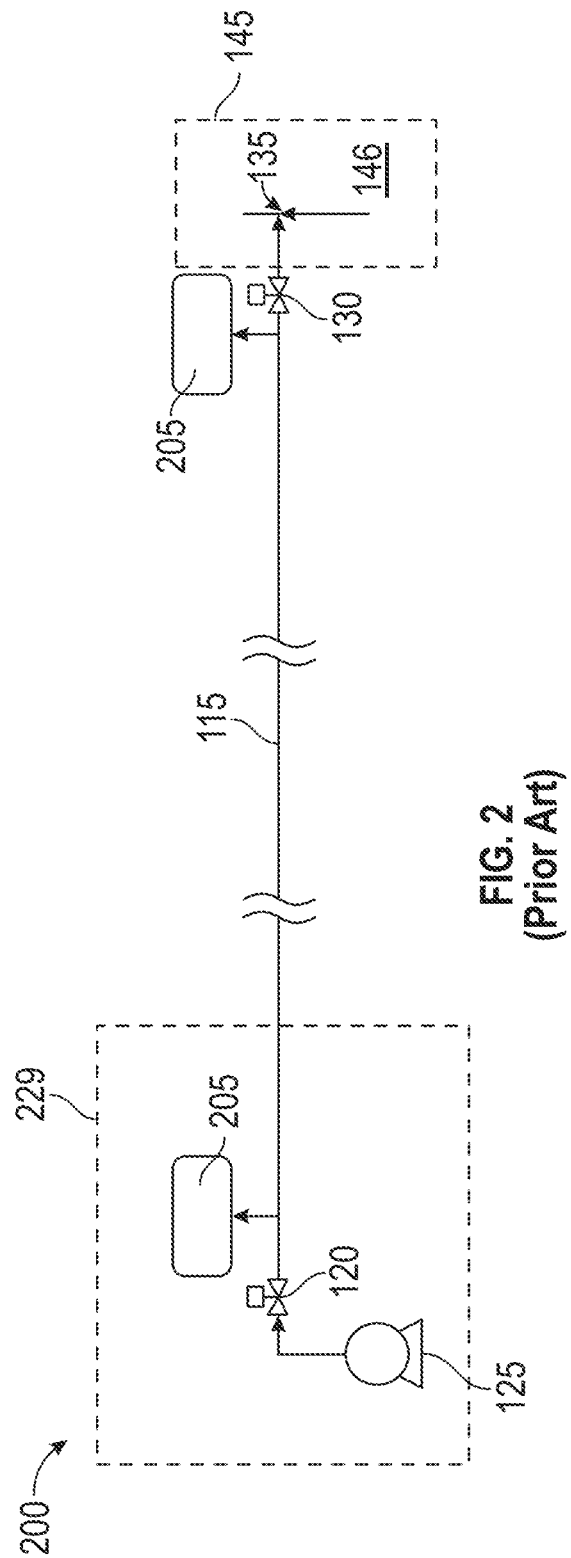
FIG. 1
(Prior Art)
FIG. 2
(Prior Art)

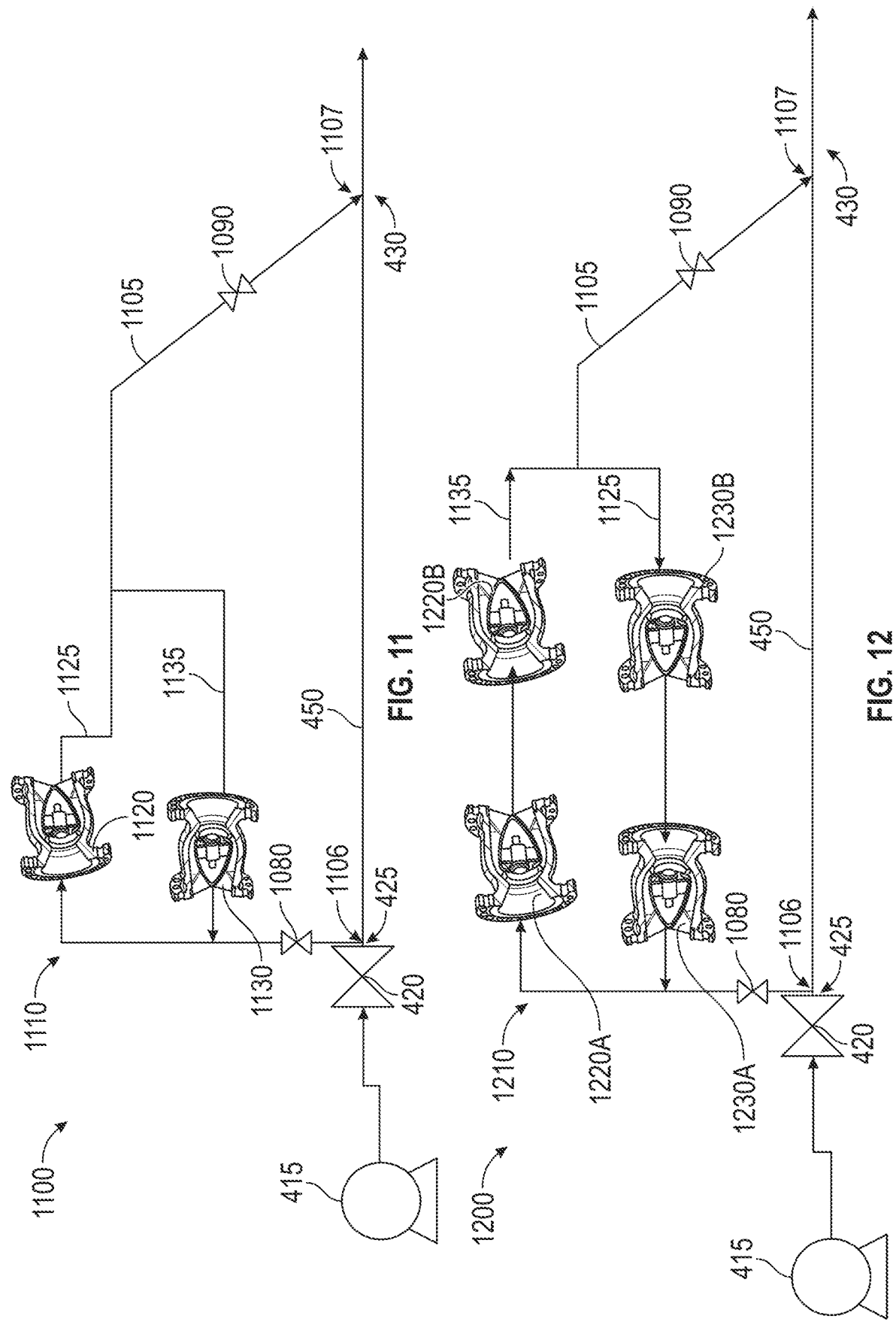

SYSTEM AND METHOD FOR MITIGATING WATER HAMMER BY LOOPING SURGE PRESSURE

TECHNICAL FIELD

Embodiments relate generally to a system and method for mitigating the magnitude of water hammer in a liquid pipeline system, and particularly, to mitigating the magnitude by implementing a flow controlled branch pipeline fluidly coupled to a main pipeline to loop surge pressure.

BACKGROUND

In upstream oil and gas operations, produced water often must be transported from production facilities to injection wells via pipelines. In addition, oil water emulsion (e.g., produced "wild" crude including oil and water) often has to be transported from satellite gas oil separation plants (GOSPs) and gathering systems to nearby surface processing facilities via pipelines. In such pipelines (e.g., main pipeline, pipeline systems), water hammering (e.g., surge pressure, transient pressure, pressure wave, and the like) occurs when fluid (e.g., produced water, wild crude, and the like) flowing through the pipeline is suddenly stopped as a result of a surge component (e.g., valve, pump, pipeline pig, and the like) disposed on the pipeline experiencing an operation upset scenario (e.g., pump tripping, pump startup, sudden valve closure, emergency shutdown, stuck scraper during pipeline scraping, and the like). As a result, kinetic energy of the moving liquid or fluid is transformed into pressure energy, resulting in creation of an acoustic pressure wave travelling at high speed (e.g., speed of sound) and reverberating in the fluid flowing through the pipeline.

The magnitude of this generated transient pressure wave and the time duration of the transient condition depends on pipeline conditions (e.g., liquid velocity, pipeline material, and system boundary conditions of the pipeline like tanks, pumps, air valves, control valves, changes in pipeline diameter, and the like). Thus, water hammer can be described as an increase (and decrease) in pressure due to rapid changes in the velocity of liquid flowing through the pipeline. Such a pressure surge (and pressure drop) can cause significant damage to the pipeline during both high and low/vacuum pressure conditions. For example, when the generated excessive high pressure (e.g., spike pressure, peak pressure, surge pressure, and the like) exceeds a surge threshold of a predetermined allowable design pressure range (e.g., normal operation range) of the pipeline, the damage can be in the form of pipeline rupture, damage to pump, piping, or fittings, excessive movement, severe vibration, and the like. Conversely, when the generated excessive low pressure (e.g., negative pressure, valley pressure, vacuum pressure, vapor column collapse pressure, and the like) exceeds a vacuum threshold of the predetermined allowable design pressure range of the pipeline, the damage can be in the form of pipeline buckling, implosion, leakage at pipe joints, stripping of internal coating, and the like.

The magnitude (e.g., intensity, strength, and the like) of the transient pressure peaks and valleys generated during the water hammer condition may depend on factors such as: (i) pipeline length—the longer the pipeline, the stronger the hydraulic transients; (ii) fluid velocity—the more rapidly the flow changes, the higher the generated hydraulic transients; (iii) elastic properties of the fluid and the pipes; (iv) possible contents of dissolved or gaseous gases in the fluid; gas bubbles normally reduce the transients; (v) formation and appearance of vapor pockets (cavities) in the water; (vi) any applied protective measures like surge chambers, air vessels, air valves, frequency-controlled pumps, and the like. Flow change in the pipeline may result from valve operation or pump characteristics. Potential causes for fast or sudden flow changes may include: (a) fast pump startup or shutdown; (b) fast valve closure/opening; (c) power interruption; (d) check valve slamming shut on reverse flow; (e) water column separation; (f) stuck scraper; (g) air pockets in the pipeline; and the like.

It is desirable to prevent or reduce the magnitude of the water hammer phenomenon in liquid pipeline systems to prevent damage to the pipeline and components thereof. One conventional technique used to mitigate water hammer includes controlling and slowing down pump startup. However, pump emergency shutdown cannot be controlled or slowed down, thereby resulting in water hammer related damage. Another conventional technique involves slowly opening and closing the valves. Again, this may not be feasible for emergency shutdown scenarios. Yet another conventional water hammer mitigation technique involves minimizing (or limiting) pipeline fluid velocity by increasing pipeline diameter. However, this will result in high capital cost and high corrosion as a result of the low velocity. Other water hammer mitigation techniques involve installing certain conventional surge protection devices (e.g., axial surge relief valves and surge relief tanks, and surge accumulators) on the pipeline.

FIG. 1 illustrates a conventional water hammer mitigation system 100 that utilizes axial surge relief valves and external surge relief tanks. A surge relief valve is a safety relief valve that has high response speed and that is designed to open and allow the excess high surge to be bled out into a breakout tank for safety. As shown in FIG. 1, conventional water hammer mitigation system 100 may include disposal water injection plant 129 including pump 125 and shutdown valve 120 disposed on main disposal water injection pipeline 115. System 100 may further include well isolation valve 130 and choke valve 135 disposed adjacent to water injection well 146 at disposal water injection site 145. A surge condition may occur when shutdown valve 120 and/or well isolation valve 130 are closed/opened suddenly, resulting in sudden change in fluid velocity of liquid flowing through pipeline 115. To mitigate the water hammer effect, system 100 may be equipped with conventional axial surge relief valves 105 and surge relief tanks 110 installed on pipeline 115 adjacent (proximal) to shutdown valve 120 and well isolation valve 130, respectively. The relief valves 105 may be designed to open when the pressure of the fluid flowing through pipeline 115 exceeds the pressure in a pilot chamber. Alternately, relief valves 105 may be designed to open by upstream pressure against a pilot pressure which is normally maintained at the pressure of the pipeline 115 augmented by a slight biasing force. When relief valve 105 opens (e.g., due to high surge pressure), fluid from main pipeline 115 is released into a corresponding external surge relief tank 110 (storage tank). However, such conventional system 100 in which surge relief valves 105 release fluid to external tanks 110 adds additional cost to the system, and will be limited to applications where space is available to store the relieved fluid. Further, additional pumping will be required to pump the liquid from the tanks 110 back into the pipeline.

FIG. 2 illustrates another conventional water hammer mitigation system 200 that utilizes surge accumulators. Like components in FIG. 2 are denoted with like reference numerals as in FIG. 1. As shown in FIG. 2, disposal water injection plant 229 of conventional water hammer mitigation system 200 may include conventional surge accumulator 205 disposed adjacent (proximal) to shutdown valve 120. Another conventional surge accumulator 205 may also be disposed adjacent to well isolation valve 130 for water hammer mitigation. Each surge accumulator 205 includes a tank that has an internal gas filled bladder. As the pressure increases in pipeline 115, fluid in the pipeline will expel into the surge accumulator 205 compressing the gas filled bladder, thereby absorbing the shock, and then, the fluid will empty back into the pipeline 115 when the pressure decreases, due to the expansion/decompression of the gas filled bladder inside the tank of surge accumulator 205. However, such conventional system 200 will require the installation and maintenance of accumulator 205 with a pressurized bladder and a tank to absorb the surge. For large pipelines, multiple accumulators 205 will be needed to displace larger volumes of fluid. This will lead to increased cost and require additional space for the bladders and tanks of accumulator 205. Further, the pressurized bladder of the surge accumulator 205 is also susceptible to failure or leakage, thereby incurring maintenance costs. Still further, the size of the bladder and the tank of accumulator 205 could be a limiting factor for installation. A better, simpler, lower-maintenance, and more cost effective approach for water hammer mitigation in a liquid pipeline system is desirable.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a water hammer mitigation system includes: a branch connection with a first end fluidly coupled to a main pipeline at a surge point on the main pipeline and a second end fluidly coupled to the main pipeline at a distal point on the main pipeline that is distal to the surge point; and a bi-directional surge relief device disposed on the branch connection, where the bi-directional surge relief device is operable to move to a first open configuration to permit pipeline fluid flowing through the main pipeline to flow via the branch connection from the first end to the second end in response to pressure at the surge point on the main pipeline reaching a first predetermined threshold pressure, where the bi-directional surge relief device is operable to move to a second open configuration to permit the pipeline fluid flowing through the main pipeline to flow via the branch connection from the second end to the first end in response to the pressure at the surge point on the main pipeline reaching a second predetermined threshold pressure, and where the bi-directional surge relief device is operable to maintain a closed configuration to prohibit the pipeline fluid from flowing through the branch connection in either direction in response to the pressure at the surge point on the main pipeline being between the first and second predetermined threshold pressures.

In another embodiment, the surge point is proximal to a surge component installed on the main pipeline, and where the surge point is a point on the main pipeline where a transient pressure wave is expected to occur in response to the surge component experiencing an operation upset scenario. In yet another embodiment, the surge component includes at least one of a pump, a valve, and a pipeline pig, disposed on the main pipeline, and where the operation upset scenario is an operation associated with the surge component that causes a rapid change in fluid velocity of the pipeline fluid flowing through the main pipeline resulting in creation of the transient pressure wave in the pipeline fluid. In yet another embodiment, the surge point is adjacent to and on a downstream side of the surge component on the main pipeline. In yet another embodiment, the surge point is adjacent to and on an upstream side of the surge component on the main pipeline.

In yet another embodiment, the system further includes a plurality of surge points on the main pipeline, where the branch connection and the bi-directional surge relief device are separately provided for each of the plurality of surge points. In yet another embodiment, the branch connection is a pipeline having a pipe diameter substantially in the range of 1-8 inches, and a pipeline length substantially in the range of 5-100 feet, and the first end of the branch connection is fluidly coupled to the main pipeline at the surge point substantially at a right angle, and the second end of the branch connection is fluidly coupled to the main pipeline at the distal point at an inclined angle.

In yet another embodiment, the bi-directional surge relief device is a dual surge relief valve disposed in an internal flow path of the branch connection between the first and second ends thereof, the dual surge relief valve including: a housing defining a surge end and a vacuum end opposite to the surge end; first and second relief valves respectively disposed at the surge and vacuum ends of the housing; a first closure member that is operable to move into and out of contact with a surge seat to move the first relief valve between the closed configuration prohibiting the pipeline fluid from flowing through the branch connection, and the first open configuration permitting the pipeline fluid to flow through the branch connection from the first end to the second end; a second closure member that is operable to move into and out of contact with a vacuum seat to move the second relief valve between the closed configuration and the second open configuration permitting the pipeline fluid to flow through the branch connection from the second end to the first end; a first plurality of internal flow channels extending longitudinally through the housing between an internal flow cavity of the first relief valve and the vacuum end, where the first plurality of internal flow channels permit the pipeline fluid to flow therethrough in the first open configuration of the first relief valve; a second plurality of internal flow channels extending longitudinally through the housing between an internal flow cavity of the second relief valve and the surge end, where the second plurality of internal flow channels permit the pipeline fluid to flow therethrough in the second open configuration of the second relief valve.

In yet another embodiment, the dual surge relief valve further includes: a first biasing member operable to maintain the first relief valve in the closed configuration when a differential pressure acting on the first closure member is below the first predetermined threshold pressure, and operable to move the first relief valve from the closed configuration to the first open configuration when the differential pressure reaches the first predetermined threshold pressure; and a second biasing member operable to maintain the second relief valve in the closed configuration when a differential pressure acting on the second closure member is below the second predetermined threshold pressure, and operable to move the second relief valve from the closed configuration to the second open configuration when the differential pressure reaches the second predetermined threshold pressure, where the differential pressure acting on the first closure member corresponds to a surge pressure at the surge point on the main pipeline, and the differential pressure acting on the second closure member corresponds to a vacuum pressure at the surge point on the main pipeline.

In yet another embodiment, the first and second biasing members are spring loaded biasing members, and the first predetermined threshold pressure is defined by a set point of a coil spring of the first biasing member, and the second predetermined threshold pressure is defined by a set point of a coil spring of the second biasing member.

In yet another embodiment, the bi-directional surge relief device is an active bi-directional surge relief device disposed at least partially in an internal flow path of the branch connection between the first and second ends, the active bi-directional surge relief device including: a pressure sensor configured to measure the pressure at the surge point on the main pipeline; a control valve disposed on the branch connection between the first and second ends, where the control valve is configured to selectively permit a flow of the pipeline fluid through the branch connection by varying a size of an opening thereof; and a control unit communicatively coupled to the pressure sensor and the control valve, where the control unit is configured to: receive, from the pressure sensor, pressure data indicating the pressure at the surge point on the main pipeline; compare the received pressure data with data representing the first and second predetermined threshold pressures; maintain the control valve in the closed configuration in response to determining based on the comparison that the pressure at the surge point on the main pipeline is within a predetermined allowable design pressure range of the main pipeline defined by the first and second predetermined threshold pressures; transmit a control signal to move the control valve from the closed configuration to an open configuration in response to determining based on the comparison that the pressure at the surge point on the main pipeline is outside of the predetermined allowable design pressure range of the main pipeline.

In yet another embodiment: the branch connection includes a first branch channel and a second branch channel between the first and second ends, the control valve is disposed on the first branch channel and is configured to selectively permit a flow of the pipeline fluid through the branch connection and via the first branch channel from the first end to the second end, the active bi-directional surge relief device further includes a second control valve disposed on the second branch channel, where the second control valve is configured to selectively permit a flow of the pipeline fluid through the branch connection and via the second branch channel from the second end to the first end, and the control unit is communicatively coupled to the second control valve, and is further configured to: maintain the control valve and the second control valve in the closed configuration in response to determining based on the comparison that the pressure at the surge point on the main pipeline is within the predetermined allowable design pressure range; transmit a control signal to move the control valve disposed on the first branch channel from the closed configuration to the first open configuration in response to determining based on the comparison that the pressure at the surge point on the main pipeline is greater than the first predetermined threshold pressure; and transmit a control signal to move the second control valve on the second branch channel from the closed configuration to the second open configuration in response to determining based on the comparison that the pressure at the surge point on the main pipeline is greater than the second predetermined threshold pressure.

In yet another embodiment, the control valve is a first pressure control valve, and the second control valve is a second pressure control valve, and where the pressure sensor includes a first pressure sensor disposed at an upstream end of the first pressure control valve on the first branch channel, and a second pressure sensor disposed at an upstream end of the second pressure control valve on the second branch channel.

In yet another embodiment, the branch connection includes a first branch channel and a second branch channel between the first and second ends, and the bi-directional surge relief device includes at least one first check valve disposed on the first branch channel, and at least one second check valve disposed on the second branch channel, the at least one first check valve is operable to maintain the closed configuration when a differential pressure acting on the first check valve is below the first predetermined threshold pressure, and operable to move to the first open configuration when the differential pressure reaches the first predetermined threshold pressure, the at least one second check valve is operable to maintain the closed configuration when a differential pressure acting on the at least one second check valve is below the second predetermined threshold pressure, and operable to move to the second open configuration when the differential pressure reaches the second predetermined threshold pressure, and where the differential pressure acting on the at least one first check valve corresponds to a surge pressure at the surge point on the main pipeline, and the differential pressure acting on the at least one second check valve corresponds to a vacuum pressure at the surge point on the main pipeline.

In yet another embodiment: the branch connection includes a first branch channel and a second branch channel between the first and second ends, the bi-directional surge relief device is disposed on the first branch channel, and the water hammer mitigation system further includes a second bi-directional surge relief device that is disposed on the second branch channel.

In yet another embodiment, a water hammer mitigation method includes: maintaining a bi-directional surge relief device installed on a branch pipeline in a closed configuration to prohibit pipeline fluid flowing in a main pipeline from flowing through the branch pipeline in response to pressure at a surge point on the main pipeline being between a predetermined vacuum pressure threshold and a predetermined surge pressure threshold, where a first end of the branch pipeline is fluidly coupled to the main pipeline at a surge point on the main pipeline and a second end of the branch pipeline is fluidly coupled to the main pipeline at a distal point on the main pipeline that is distal to the surge point; operating the bi-directional surge relief device to move to a first open configuration to permit the pipeline fluid flowing through the main pipeline to flow via the branch pipeline from the first end to the second end and into the main pipeline via the distal point, in response to the pressure at the surge point on the main pipeline reaching the predetermined surge pressure threshold; and operating the bi-directional surge relief device to move to a second open configuration to permit the pipeline fluid flowing through the main pipeline to flow via the branch pipeline from the second end to the first end and into the main pipeline via the surge point, in response to the pressure at the surge point on the main pipeline reaching the predetermined vacuum pressure threshold.

In yet another embodiment, the method further includes: receiving sensor data from one or more sensors, the sensor data representing the pressure at the surge point on the main pipeline; comparing the received sensor data to preset data representing the predetermined vacuum pressure threshold and preset data representing the predetermined surge pressure threshold; maintaining the bi-directional surge relief device in the closed configuration in response to determining based on the comparison that the pressure at the surge point on the main pipeline is within a predetermined allowable design pressure range; transmitting a control signal to move the bi-directional surge relief device to the first open configuration in response to determining based on the comparison that the pressure at the surge point on the main pipeline is greater than the predetermined surge pressure threshold; and transmit a control signal to move the bi-directional surge relief device to the second open configuration in response to determining based on the comparison that the pressure at the surge point on the main pipeline is greater than the predetermined vacuum pressure threshold.

In yet another embodiment, a flow path for the pipeline fluid from the first end of the second end of the branch pipeline in the first open configuration is the same as a flow path for the pipeline fluid from the second end to the first end of the branch pipeline in the second open configuration, where a flow path for the pipeline fluid from the first end to the second end of the branch pipeline in the first open configuration is different from a flow path for the pipeline fluid from the second end to the first end of the branch pipeline in the second open configuration.

In yet another embodiment, a dual surge relief valve is disposed in an internal flow path of a branch connection having a first end fluidly coupled to a main pipeline at a surge point on the main pipeline and a second end fluidly coupled to the main pipeline at a distal point on the main pipeline distal to the surge point, the dual surge relief valve including: a housing defining a surge end and a vacuum end opposite to the surge end; first and second relief valves respectively disposed on the surge and vacuum ends of the housing; a first closure member that is operable to move into and out of contact with a surge seat to move the first relief valve between a closed configuration prohibiting pipeline fluid, which is flowing through the main pipeline, from flowing through the branch connection, and a first open configuration permitting the pipeline fluid to flow through the branch connection from the first end to the second end thereof; a second closure member that is operable to move into and out of contact with a vacuum seat to move the second relief valve between the closed configuration and a second open configuration permitting the pipeline fluid to flow through the branch connection from the second end to the first end thereof; a first plurality of internal flow channels extending longitudinally through the housing between an internal flow cavity of the first relief valve and the vacuum end, where the first plurality of internal flow channels permit the pipeline fluid to flow therethrough in the first open configuration of the first relief valve; a second plurality of internal flow channels extending longitudinally through the housing between an internal flow cavity of the second relief valve and the surge end, where the second plurality of internal flow channels permit the pipeline fluid to flow therethrough in the second open configuration of the second relief valve; a first biasing member operable to maintain the first relief valve in the closed configuration when a differential pressure acting on the first closure member is below a predetermined surge pressure threshold, and operable to move the first relief valve from the closed configuration to the first open configuration when the differential pressure reaches the predetermined surge pressure threshold; a second biasing member operable to maintain the second relief valve in the closed configuration when a differential pressure acting on the second closure member is below a predetermined vacuum pressure threshold, and operable to move the second relief valve from the closed configuration to the second open configuration when the differential pressure reaches the predetermined vacuum pressure threshold, where the differential pressure acting on the first closure member corresponds to a surge pressure at the surge point on the main pipeline, and the differential pressure acting on the second closure member corresponds to a vacuum pressure at the surge point on the main pipeline.

In yet another embodiment, where the first and second biasing members are spring loaded biasing members, and where the predetermined surge pressure threshold is defined by a set point of a coil spring of the first biasing member, and the predetermined vacuum pressure threshold is defined by a set point of a coil spring of the second biasing member.

In yet another embodiment, each of the first and second biasing members is an active biasing member actuated by an actuator and controlled by a control unit based on pressure sensor data, and where the control unit is configured to: actuate the first and second biasing members to maintain the closed configuration based on a comparison of the pressure sensor data indicating the pressure at the surge point and data representing the predetermined surge pressure threshold and the predetermined vacuum pressure threshold indicating that the surge pressure at the surge point is less than the predetermined surge pressure threshold, and the vacuum pressure at the surge point is less than the predetermined vacuum pressure threshold; actuate the first biasing member to the first open configuration in response to the comparison indicating that the surge pressure at the surge point has reached the predetermined surge pressure threshold; and actuate the second biasing member to the second open configuration in response to the comparison indicating that the vacuum pressure at the surge point has reached the predetermined vacuum pressure threshold.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 1 is a schematic diagram illustrating a conventional water hammer mitigation system utilizing surge relief tanks and surge relief valves in accordance with prior art.

FIG. 2 is a schematic diagram illustrating another conventional water hammer mitigation system utilizing surge accumulators in accordance with prior art.

FIG. 11 is a schematic diagram illustrating yet another embodiment of a water hammer mitigation system.

FIG. 12 is a schematic diagram illustrating yet another embodiment of a water hammer mitigation system.

Figure 3:
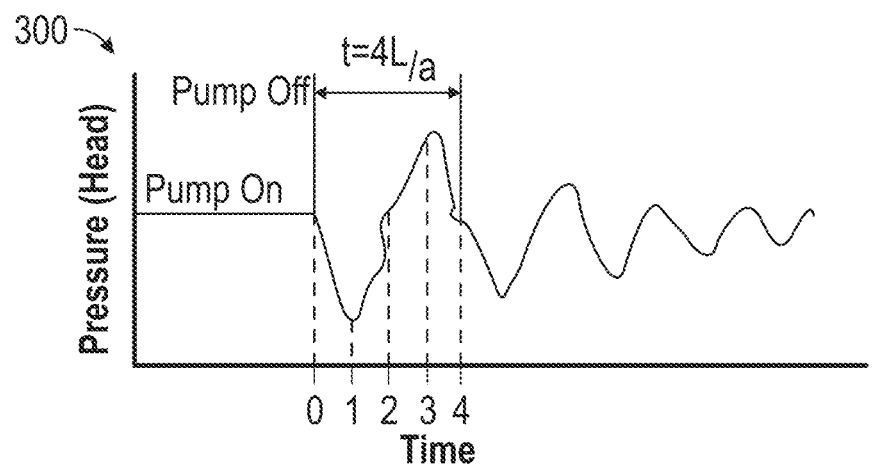
FIG. 3 is a line graph illustrating a magnitude of a pressure wave over time along the main pipeline upon occurrence of an operation upset scenario in accordance with one or more embodiments.

While certain embodiments will be described in connection with the illustrative embodiments shown herein, the subject matter of the present disclosure is not limited to those embodiments. On the contrary, all alternatives, modifications, and equivalents are included within the spirit and scope of the disclosed subject matter as defined by the claims. In the drawings, which are not to scale, the same reference numerals are used throughout the description and in the drawing figures for components and elements having the same structure.

DETAILED DESCRIPTION

In the following description, for purposes of explanation, numerous specific details are set forth in order to provide a thorough understanding of the inventive concept. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" or "another embodiment" means that a particular feature, structure, or characteristic described in connection with the embodiment is included in at least one embodiment of the disclosed subject matter, and multiple references to "one embodiment" or "an embodiment" or "another embodiment" should not be understood as necessarily all referring to the same embodiment.

This disclosure pertains to a system and method for mitigating a magnitude of water hammer (e.g., surge pressure, transient pressure, pressure wave, and the like) in a liquid pipeline system by looping the surge pressure internally. Techniques disclosed herein look to install a branch connection (e.g., branch pipeline, branch line) that is fluidly coupled at both ends thereof to a main pipeline where the surge pressure wave is expected to occur in case of an operation upset scenario (e.g., pump tripping, pump startup, sudden valve closure, emergency shutdown, stuck scraper during pipeline scraping, and the like) corresponding to a surge component (e.g., pump, valve, pipeline pig, and the like) disposed on the main pipeline. The branch connection is fluidly coupled to the main pipeline such that a first end of the branch connection is coupled to a surge point on the main pipeline where the surge pressure conditions are expected to occur, and a second end of the branch connection is coupled to a distal point on the main pipeline that is distal to the surge point. The surge point may be a point that is adjacent or proximal (e.g., upstream or downstream) to the surge component disposed on the main pipeline. The main pipeline may be determined to have multiple surge points, and a branch connection may be installed on the main pipeline for each surge point.

Each branch connection installed on the main pipeline may be equipped with at least one bi-directional surge relief device (e.g., passive bi-directional surge relief device (e.g., a dual surge relief valve with internal flow channels, check valve), active bi-directional surge relief device (e.g., pressure control valve, control valve, actuator, control unit, pressor sensor)). Size (e.g., pipe diameter), length, shape, and other characteristics of the branch connection may be determined based on expected surge or water hammer conditions (e.g., fluid velocity, surge wave speed, expected vacuum/low pressure and high surge pressure) determined by performing a full surge analysis study (e.g., using commercially available software like SPS or Synergi) of the liquid pipeline system. For example, the branch connection may have a pipe diameter in the range of 1-8 inches, a length of 5-100 feet, the first end of the branch connection may be fluidly coupled to the main pipeline at the surge point thereof substantially at right angles (e.g., 90°), and the second end of the branch connection may be fluidly coupled to the main pipeline at the distal end thereof at an inclined angle (e.g., 135°).

During normal operation, the bi-directional surge relief device may be operable to maintain a closed configuration to prohibit (e.g., restrict, prevent, and the like) the pipeline fluid from flowing through the branch pipe in either direction, while the pipeline fluid flows normally through the main pipeline in a forward direction. During abnormal operation (e.g., surge pressure or high pressure at surge point greater than first preset (surge) threshold, low or vacuum pressure at the surge point greater than second preset (vacuum) threshold; detected pressure at surge point outside the predetermined allowable design pressure range for the normal operation; having abnormal (high or low) pressure), the bi-directional surge relief device may be operable to move to an open configuration (e.g., first open configuration, second open configuration) to selectively permit the pipeline fluid to flow through the branch pipe in either the forward (e.g., from first (surge point) end to second (distal point) end of branch connection) direction or a reverse direction (e.g., from second end to first end of branch connection), based on differential pressure established in the pipeline fluid between upstream and downstream ends the bi-directional surge relief device or based on measured pressure at the surge point, and the preset first and second threshold pressures.

For each direction (forward or reverse), the preset (first or second) threshold pressure of the bi-directional surge relief device may correspond to a pressure at which the bi-directional surge relief device moves from the closed configuration obstructing fluid flow in the corresponding direction through the branch connection to a (first or second) open configuration allowing the fluid flow in the corresponding direction. For example, in case of surge pressure (e.g., pressure spike, high pressure, and the like) at the surge point being higher than a preset first (surge) threshold pressure, the surge relief device is operable to move from the closed configuration to a first open configuration to enable flow of the main pipeline fluid via the branch connection from the first end of the branch pipe toward the second end thereof, thereby directly relieving the pressurized fluid at the surge point via the first end of the branch pipeline connected to the main pipeline at the surge point, and driving the fluid back to the main pipeline at the distal point on the main line via the second end. Similarly, in case of vacuum pressure (e.g., negative pressure, low pressure, and the like) at the surge point being greater than a second preset (vacuum) threshold pressure (i.e., vacuum pressure lower than the vacuum design pressure limit of the pipeline), the bi-directional surge relief device is operable to move from the closed configuration to a second open configuration to enable flow of the pipeline fluid from the main pipeline to the branch pipe via the second end of the branch pipeline and from the second end of the branch toward the first end, thereby flowing the fluid in a reverse direction in the branch pipeline as compared to the normal flow direction in the main pipeline, and filling the vacuum in the main line proximal to the surge point where the high vacuum pressure condition has occurred to mitigate the transient or surge pressure wave. In some embodiments, one or both of the first and second preset threshold pressures may be set greater than the corresponding normal (high and low) operating pressure depending on the safety limit of the pipeline/system.

The water hammer mitigation system is thus capable of stabilizing rapidly the pressure wave along the main pipeline by suppressing a high pressure wave that is reflected from an end of the pipeline toward the surge point (or the high pressure wave that hits the obstacle at the surge point). For example, when the surge component experiences the operation upset scenario (e.g., automated shutdown valve), the fluid that is flowing from an end of the pipeline toward the surge point adjacent to the surge component (obstacle) is directly relieved and reversed via the branch pipeline connected with the main pipeline at the surge point. That is, once the fluid hits the surge component that is obstructing the fluid flow through the main pipeline proximal to the surge point, the pressurized pipeline fluid is directly relieved through the branch pipeline and driven back to the main line at the distal point, thereby relieving the high or surge pressure. By implementing the water hammer mitigation system, the pressure wave that develops in the main pipeline due to the operation upset scenario of the surge component can be moderated and stabilized rapidly and damage to the pipeline or its components can be prevented.

In some embodiments, the bi-directional surge relief device is a passive bi-directional surge relief device (e.g., dual surge relief valve, plural check valves) that is disposed on the branch line and that includes spring loaded closure members (e.g., plugs) that maintain the closed configuration for the branch connection in both directions during the normal operation, and that have respective preset spring loaded threshold pressure set points that respectively define the first and second threshold pressures that, when reached by the differential pressure established in the pipeline fluid, cause the bi-directional surge relief device to move from the bi-directional closed configuration to the first or second open configurations. In other embodiments, the bi-directional surge relief device is an active bi-directional surge relief device (e.g., including one or more of a control valve, a pressure control valve, a pressure sensor or indicator, a control unit, a valve actuator, and the like) that is at least partially disposed on the branch pipeline and that is operable to move between the closed configuration, and the first or second open configurations based on pressure sensor data indicating the pressure of the pipeline fluid at the surge point (or at another point on the main pipeline or branch pipeline), and based on the preset first and second threshold pressures for opening the surge relief device in either direction. For example, a control unit of the active surge relief device may be configured to control, based on the measured pressure sensor data and the predetermined first and second threshold pressure data, respective valve actuators of the active bi-directional surge relief device to move the control vales or the pressure control valves of the active device between the closed configuration, and the first and second open configurations.

The water hammer mitigation system according to the present disclosure may also include embodiments where a plurality of dissimilar active and/or passive bi-directional surge relief devices are disposed in the branch connection to provide redundancy and maintain operation of the surge mitigation system even in the case of failure or malfunction of one of the bi-directional surge relief devices.

Water hammering is a significant issue that should be addressed and accounted for at any gas and liquid plant. As explained previously, water hammer is caused by a surge component experiencing an operation upset scenario (e.g., sudden closing or opening of a valve in the piping system, switching off the power supply, a power failure, equipment failure, emergency shutdown, pump tripping, pump startup, stuck scrapers during pipeline scraping, and the like). That is, the surge/transient pressure occurs when liquid flowing in the pipeline is suddenly stopped as a result of the operation upset scenario of the surge component (e.g., pump, valve, pipeline scraper pig, and the like). These sudden changes will immediately create pressure waves travelling and reverberating through the pipeline on both sides of the obstruction (e.g., on both upstream and downstream sides of the surge component (e.g., closed valve)), which leads to abnormal high and/or low pressures that may exceed the allowable design pressure range of the pipeline system. FIG. 3 shows line graph 300 illustrating a magnitude of a pressure wave over time at a surge point on the main pipeline upon occurrence of the operation upset scenario of the surge component which is proximal to the surge point in accordance with one or more embodiments. As shown in FIG. 3, the surge component (e.g., pump) experiences the operation upset scenario (e.g., sudden pump shutdown) at time 0, causing the pressure wave to generate in the fluid flowing along the main pipeline at the surge point proximal to (e.g., downstream of) the surge component on the main pipeline. In FIG. 3, the valleys represent low or vacuum pressure at the surge point in the main pipeline, and the peaks or spikes represent high surge pressure at the surge point. Graph 300 (developed by the Schneider-Bergeron method) clearly illustrates the repeating pressure wave profile along the main pipeline during the water hammer phenomenon. As explained previously, if left unchecked, such a pressure wave may develop a flow turbulence and may end up causing catastrophic damage to the pipeline system. Surge pressure can be estimated using Joukowsky's equation in a simple piping system as follows:

$$\Delta H = c/g \Delta V$$

Where,
$\Delta H$: change in head pressure,
C: wave velocity,
g: gravitational force, and
$\Delta V$: change in fluid velocity.

Figure 4:
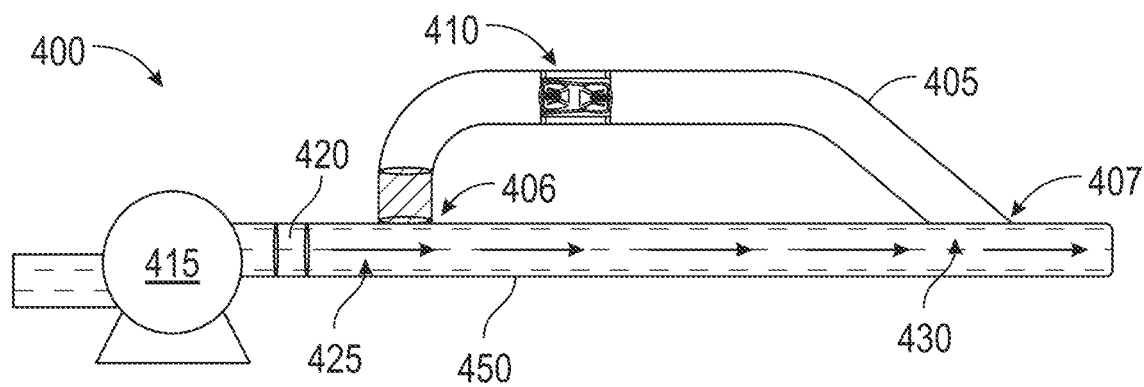
FIG. 4 is a schematic diagram illustrating a water hammer mitigation system utilizing a branch connection and a bi-directional surge relief device in accordance with one or more embodiments.

To overcome the above problems, that present disclosure implements water hammer mitigation systems and methods as described in connection with FIGS. 4-14. FIG. 4 is a schematic diagram illustrating water hammer mitigation system 400 utilizing branch connection 405 and bi-directional surge relief device 410 in accordance with one or more embodiments. As shown in FIG. 4, system 400 includes branch connection (e.g., branch line, branch pipe) 405 installed on main pipeline 450, and surge relief device 410 installed on branch pipe 405. Branch pipeline 405 and bi-directional surge relief device 410 are designed to mitigate and avoid abnormal high and low pressures in main line 450 by allowing the liquid to flow through the branch pipeline 405 when the pressure at the surge point reaches respective predetermined first (surge) and second (vacuum) pressure thresholds.

A first end 406 of branch pipe 405 is fluidly coupled to main pipe 450 at surge point 425 that is in close proximity to (e.g., adjacent to) a surge component (e.g., shutdown valve 420, pump 415) that is suspect of causing surge pressure upon occurrence of the operation upset scenario. A second end 407 of branch pipe 405 is fluidly coupled to main pipe 450 at distal point 430 that is distal to the surge point 425 of main pipeline 450. Characteristics like size (e.g., pipe diameter), length, shape, and others of branch connection 405 are not intended to be limiting. For example, the pipe diameter and total length of branch connection 405 may be determined based on a length and diameter of main pipeline 450, as well as based on expected surge or water hammer conditions (e.g., fluid velocity, surge wave speed, expected vacuum/low pressure and high surge pressure) determined by performing a full surge analysis study (e.g., using commercially available software like SPS or Synergi) of the pipeline system. In some embodiments, the pipe diameter of branch pipe 405 may be in the range of 1-8 inches, a total length of the branch connection 405 between first end 406 and second end 407 may be in the range of 5-100 feet, the first end 406 may be fluidly coupled at surge point 425 on main pipeline 450 substantially at right angles (e.g., 90°), and second end 407 of branch connection 405 may be fluidly coupled at distal point 430 on main pipeline 450 at an inclined angle (e.g., 135°).

Although FIG. 4 illustrates one surge point 425 on the pipeline system, this is not intended to be limiting. In other embodiments, the full surge analysis study may determine existence of a plurality of surge points based on existence of one or more surge components on the pipeline system. That is, surge points 425 may exist on both side (e.g., both upstream and downstream sides) of the surge component. A water hammer mitigation system including branch connection 405 and bi-directional surge relief device 410 may be installed at each of the plurality of surge points 425 where the surge pressure is expected to occur in the pipeline system.

Also, FIG. 4 illustrates surge point 425 as being downstream of the surge components 420 and 415 that are expected to cause the water hammer or surge pressure. This is not intended to be limiting, a surge point that is proximal (or adjacent) to the surge component can be determined to exist on upstream and/or downstream sides of the surge component. That is, in some embodiments, the full surge analysis study may determine that surge point 425 is upstream the surge components 420 and 415, or determine that surge points 425 where a surge is expected and where the surge should be mitigated are likely on both upstream and downstream sides of the surge components 420 and 415. Still further, bi-directional surge relief device 410 in FIG. 4 is illustrated as being installed in substantially a middle portion of branch pipe 405. However, the location where bi-directional surge relief device 410 is installed on branch pipe 405 is not intended to be limiting. For example, bi-directional surge relief device 410 may be installed at any location along branch pipe 405 between first end 406 and second end 407 thereof. In some embodiments, bi-directional surge relief device 410 may be installed adjacent or proximal to first end 406.

Figure 5:
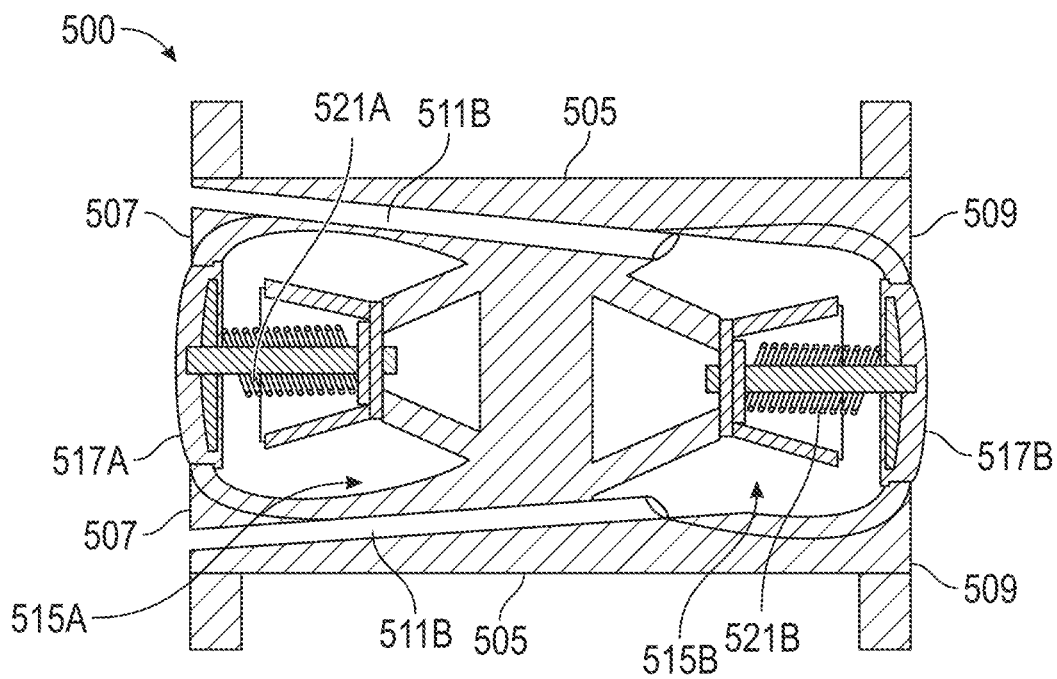
FIG. 5 is a schematic cross-sectional side view of an exemplary dual surge relief valve in a closed configuration in accordance with one or more embodiments.
Figure 6:
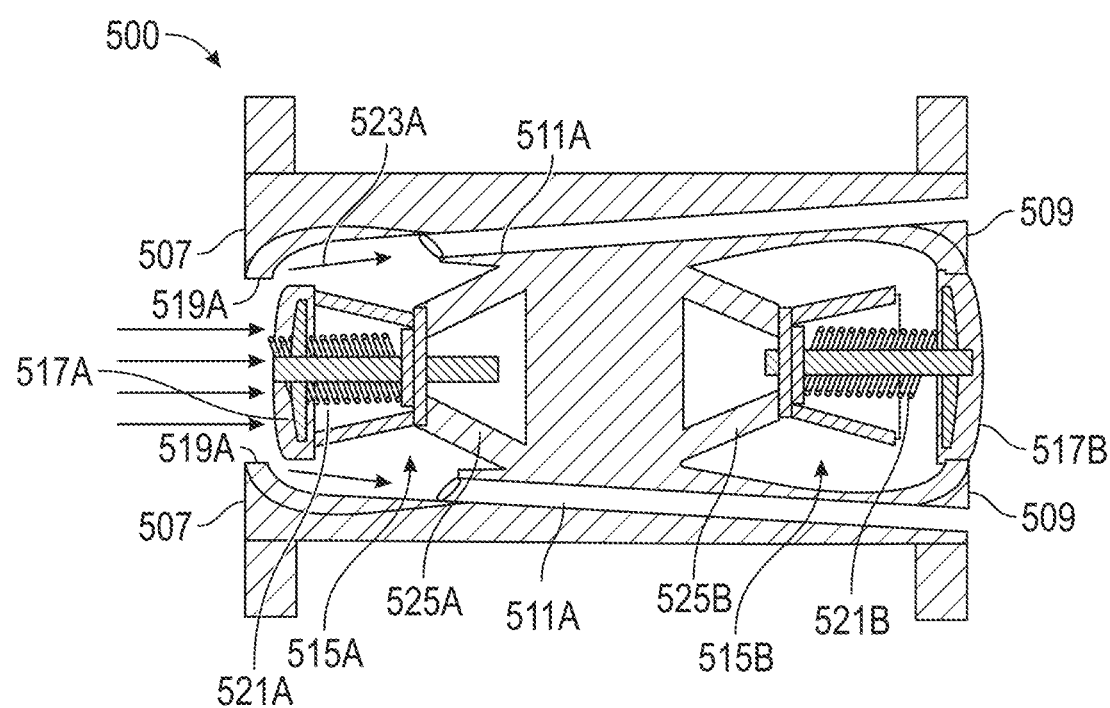
FIG. 6 is a schematic cross-sectional side view of the exemplary dual surge relief valve in a first open configuration in accordance with one or more embodiments.
Figure 7:
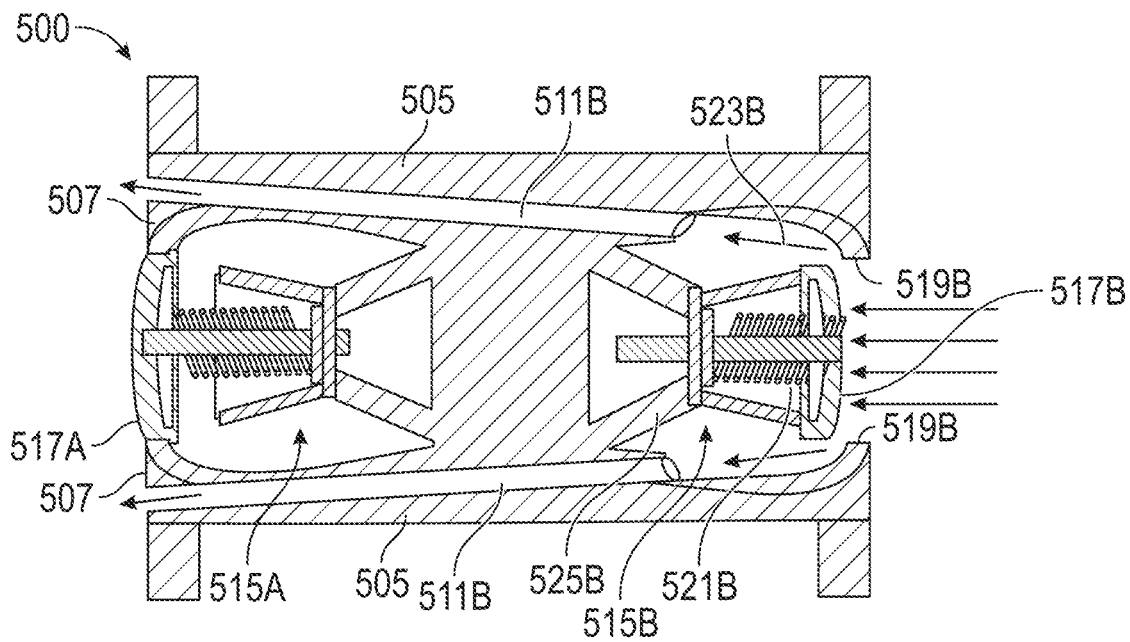
FIG. 7 is a schematic cross-sectional side view of the exemplary dual surge relief valve in a second open configuration in accordance with one or more embodiments.

Bi-directional surge relief device 410 is disposed in a flow path of branch connection 405. In the embodiment of FIG. 4, bi-directional surge relief device 410 is a passive dual surge relief valve with axial relief valves disposed at either end thereof. Structure and operation of the passive dual surge relief valve is explained in more detail below in connection with FIGS. 5-7. FIG. 5 is a schematic cross-sectional side view of exemplary dual surge relief valve 500 in a closed configuration in accordance with one or more embodiments. FIG. 6 is a schematic cross-sectional side view of exemplary dual surge relief valve 500 in the first open configuration in accordance with one or more embodiments. FIG. 7 is a schematic cross-sectional side view of the exemplary dual surge relief valve 500 in the second open configuration in accordance with one or more embodiments.

Dual surge relief valve 500 as shown in FIGS. 5-7 includes dual axial relief valves 515A and 515B that are capable of reducing the magnitude of the shock pressure waves associated with the water hammer phenomenon in the liquid pipeline system. By selectively opening fluid flow in one direction based on surge pressure or high pressure reaching the a first spring loaded (surge) threshold pressure of the corresponding axial relief valve, dual surge relief valve 500 enables relief of high surge pressure 5-100 feet away from surge point at distal point 430 on main pipeline 450. Similarly, by selectively opening fluid flow in the other direction based on vacuum pressure or low pressure reaching the a second spring loaded (vacuum) threshold pressure of the corresponding axial relief valve, dual surge relief valve 500 enables relief of vacuum pressure by filling the vacuum at surge point 425 with pipeline fluid from distal point 430 of main pipeline 450. Since dual surge relief valve 500 is a passive mechanical device, it requires minimum maintenance, and since dual surge relief valve 500 is installed on the branch pipe that loops fluid flow to the main pipeline, the fluid is not relieved outside of the system, and as a result, there is no need to install equipment (e.g., surge accumulator, surge relief tank, and the like of FIGS. 1-2) other than the branch pipe 405 to handle the surge wave on the main pipeline.

As shown in FIGS. 5-7, dual surge relief valve 500 includes housing 505, which defines first or surge end 507, and second or vacuum end 509. Although not specifically shown in FIGS. 4-7, dual surge relief valve 500 is disposed within an interior of branch pipeline 405. Relief valve 515A is provided on surge end 507 within housing 505, and relief valve 515B is provided on vacuum end 509 within housing 505, such that relief valves 515A and 515B are axially disposed on opposite sides of housing 505. Each relief valve 515 is selectively movable between at least two distinct configurations including a closed configuration (FIG. 5) and an open configuration (FIGS. 6-7). In the closed configuration in FIG. 5, each relief valve 515 is closed and completely prohibits the pipeline fluid, which is flowing through main pipeline 450, from flowing through branch pipe 405. In the (first) open configuration of relief valve 515A (FIG. 6), relief valve 515A is at least partially open and permits the pipeline fluid to flow therethrough and through branch pipe 405 from a side of surge end 507 to a side of vacuum end 509 of dual surge relief valve 500 (e.g., from first end 406 to second end 407 of branch pipe 405). Further, in the (second) open configuration of relief valve 515B (FIG. 7), relief valve 515B is at least partially open and permits the pipeline fluid to flow therethrough and through branch pipe 405 from a side of vacuum end 509 to a side of surge end 507 of dual surge relief valve 500 (e.g., from second end 407 to first end 406).

As shown in FIGS. 5-7, relief valve 515A includes closure member 517A that is respectively movable into and out of contact with surge seat 519A to move relief valve 515A between the closed and (first) open configurations. Closure member 517A is biased in a direction toward surge seat 519A by biasing member 521A. In the illustrated embodiment, biasing member 521A is a compression spring disposed centrally within housing 500 along a longitudinal axis thereof to maintain relief valve 515A in the closed configuration until a differential pressure established in the pipeline fluid between surge end 507 and vacuum end 509 acting on closure member 517A reaches a pre-selected first (surge) threshold pressure. The pre-selected first threshold pressure is defined by attributes of biasing member 521A such as a spring constant, length and pre-load incorporated into the design of relief valve 515A. Similarly, as shown in FIGS. 5-7, relief valve 515B includes closure member 517B that is respectively movable into and out of contact with vacuum seat 519B to move relief valve 515B between the closed configuration and the (second) open configuration. Closure member 517B is biased in a direction toward vacuum seat 519B by biasing member 521B. In the illustrated embodiment, biasing member 521B is a compression spring disposed centrally within housing 500 along a longitudinal axis thereof to maintain relief valve 515B in the closed configuration until the differential pressure acting on closure member 517B reaches a pre-selected second (vacuum) threshold pressure. The pre-selected second threshold pressure is defined by attributes of biasing member 521B such as a spring constant, length and pre-load incorporated into the design of relief valve 515B.

Internal flow channels 511A extend longitudinally through housing 505 of dual surge relief valve 500 between internal flow cavity 523A of relief valve 515A and vacuum end 509. When in the (first) open configuration, relief valve 515A permits pipeline fluid of main pipeline 450 that is on a side of surge end 507 to flow through internal flow cavity 523A, and out via internal flow channels 511A to thereby flow out from vacuum end 509 side of dual surge relief valve 500, and thereby enabling fluid flow from first end 406 to second end 407 of branch pipe 405. Internal flow channels 511B extend longitudinally through housing 505 of dual surge relief valve 500 between internal flow cavity 523B of relief valve 515B and surge end 507. When in the (second) open configuration, relief valve 515B permits pipeline fluid of main pipeline 450 that is on a side of vacuum end 509 to flow through internal flow cavity 523B, and out via internal flow channels 511B to thereby flow out from surge end 507 side of dual surge relief valve 500, and thereby enabling fluid flow from second end 407 to first end 406 of branch pipe 405. In the embodiment of FIGS. 5-7, two (2) internal flow channels 511 are illustrated for each relief valve 515, although more or fewer can be provided in other embodiments. Also, for ease of illustration, not all of internal flow channels 511 of each relief valve 515 are shown in each of FIGS. 5-7.

Biasing member 521A is configured such that relief valve 515A is operable to maintain the closed configuration when the differential pressure established in the pipeline fluid between surge end 507 side and vacuum end 509 side of dual surge relief valve 500 is below the pre-selected first threshold pressure, and operable to move between the closed configuration and the open configuration in response to the differential pressure reaching the pre-selected first threshold pressure. That is, when the differential pressure between upstream and downstream sides of closure member 517A reaches the pre-selected first threshold pressure, a force applied by biasing member 521A to maintain closure member 517A in contact with surge seat 519A is overcome and relief valve 515A opens. As the differential pressure increases beyond the pre-selected first threshold pressure, biasing member 521A is compressed in a proportional manner, thereby allowing closure member 517A to move away from surge seat 519A in a proportional manner. Thus, biasing member 521A is responsive to the differential pressure (which corresponds to the surge pressure or high pressure at surge point 425) to adjust a size of the opening of cavity 523A of relief valve 515A through which the pipeline fluid flows to distal point 430 on main pipeline 450. In this manner, relief valve 515A passively moves from the closed configuration of FIG. 5, wherein flow of the pipeline fluid through branch connection 405 is restricted, to the open configuration of FIG. 6 wherein the flow of the pipeline fluid through branch connection 405 via relief valve 515A is permitted. Radial fins 525A extend from an outer wall of housing 505 to support relief valve 515A within housing 505 and permit flow of the pipeline fluid around radial fins 525A.

Similarly, biasing member 521B is configured such that relief valve 515B is operable to maintain the closed configuration when the differential pressure is below the pre-selected second (vacuum) threshold pressure, and operable to move between the closed configuration and the open configuration in response to the differential pressure reaching the pre-selected second threshold pressure. That is, when the differential pressure between upstream and downstream sides of closure member 517B (which corresponds to a vacuum or low pressure at surge point 425) reaches the pre-selected second threshold pressure, a force applied by biasing member 521B to maintain closure member 517B in contact with vacuum seat 519B is overcome and relief valve 515B opens. As the differential pressure increases beyond the pre-selected second threshold pressure, biasing member 521B is compressed in a proportional manner, thereby allowing closure member 517B to move away from vacuum seat 519B in a proportional manner. Thus, biasing member 521B is responsive to the differential pressure to adjust a size of the opening of cavity 523B of relief valve 515B through which the pipeline fluid flows to surge point 425 on main pipeline 450. In this manner, relief valve 515B passively moves from the closed configuration of FIG. 5, wherein flow of the pipeline fluid through branch connection 405 is restricted, to the open configuration of FIG. 7 wherein the flow of the pipeline fluid through branch connection 405 via relief valve 515B is permitted. Radial fins 525B extend from an outer wall of housing 505 to support relief valve 515B within housing 505 and permit flow of the pipeline fluid around radial fins 525B.

In a conventional system, abnormal pressure conditions (e.g., high or surge pressure higher than first preset threshold pressure, and low or vacuum pressure higher than second preset threshold pressure, where the first and second thresholds define a predetermined allowable design pressure range of the pipeline) can occur at one or more surge points due to the transient pressure wave when the surge component associated with the surge points experiences the operation upset scenario. For example, upon occurrence of the operation upset scenario, pipeline fluid flowing through the main pipeline will continue to flow until it reaches a downstream end of main pipeline 450 past surge point 425, thereby generating vacuum pressure or vapor column collapse at surge point 425 that is higher than a corresponding vacuum pressure threshold. The downstream pipeline fluid will then flow back toward the surge point at a high velocity and hit the closed surge component (e.g., closed valve or pump), causing a rapid spike in surge pressure to impermissibly high levels higher than the corresponding surge threshold pressure. Thus, in a conventional system, both the high surge pressure and the low vacuum pressure may cause significant damage to the main pipeline and its components.

By contrast, with water hammer mitigation system 400 of FIG. 4 installed with branch pipe 405 to loop internal surge pressure, and further installed with dual surge relief device 500 of FIGS. 5-7 in the fluid flow path of branch pipe 405, the abnormal pressure conditions corresponding to the high or surge pressure and the low or vacuum pressure can be mitigated to acceptable pressure levels that are within the predetermined allowable design pressure range of the pipeline system. More specifically, upon occurrence of the operation upset scenario at the surge component (e.g., shutdown valve 420 suddenly closed), pipeline fluid flowing through main pipeline 450 will continue to flow until it reaches a downstream end of main pipeline 450, thereby generating vacuum pressure or vapor column collapse pressure at surge point 425. As a result of this vacuum pressure at surge point 425, the differential pressure at vacuum end 509 of dual surge relief valve 500 may become higher that the spring loaded (second) threshold pressure of relief valve 515B, thereby causing valve 515B to open and allow the pipeline fluid to flow through dual surge relief valve 500 from second end 407 of branch pipe 405 to first end 406, and occupy the vacuum at surge point 425, thereby diminishing the magnitude of (or mitigating) the vacuum pressure acting on main pipeline 450 at surge point 425.

Further, as a result of the pressure wave, when the downstream pipeline fluid flows back in a reverse direction toward surge point 425 at a high velocity and hits the closed surge component (e.g., closed valve or pump), causing a rapid spike in high or surge pressure at surge point 425, the differential pressure at surge end 507 of dual surge relief valve 500 may become higher than the spring loaded (first) threshold pressure of relief valve 515A, thereby causing valve 515A to open, and allow the pipeline fluid at surge point 425 to directly pass through branch pipeline 405, flow through dual surge relief valve 500 from first end 406 to second end 407, and be driven back to the main pipeline 450 at distal point 430, thereby diminishing the magnitude of (or mitigating) the high surge pressure acting on main pipeline 450 at surge point 425. Thus, since pipeline fluid at surge point 425 during the high surge pressure operation begins to move downstream in a loop via branch pipe 405 without stoppage of the fluid flow in the main pipeline 450 at the surge point 425, the magnitude of the high surge pressure (or spike) is mitigated, and as a result, the pressure wave reverberating through the pipeline 450 can be quickly and easily moderated and stabilized. The size of valves 515A and 515B, and corresponding set (first and second) spring loaded threshold pressures will be determined using data provided by the hydraulic surge analysis study that is normally conducted for the pipeline systems.

Figure 13:
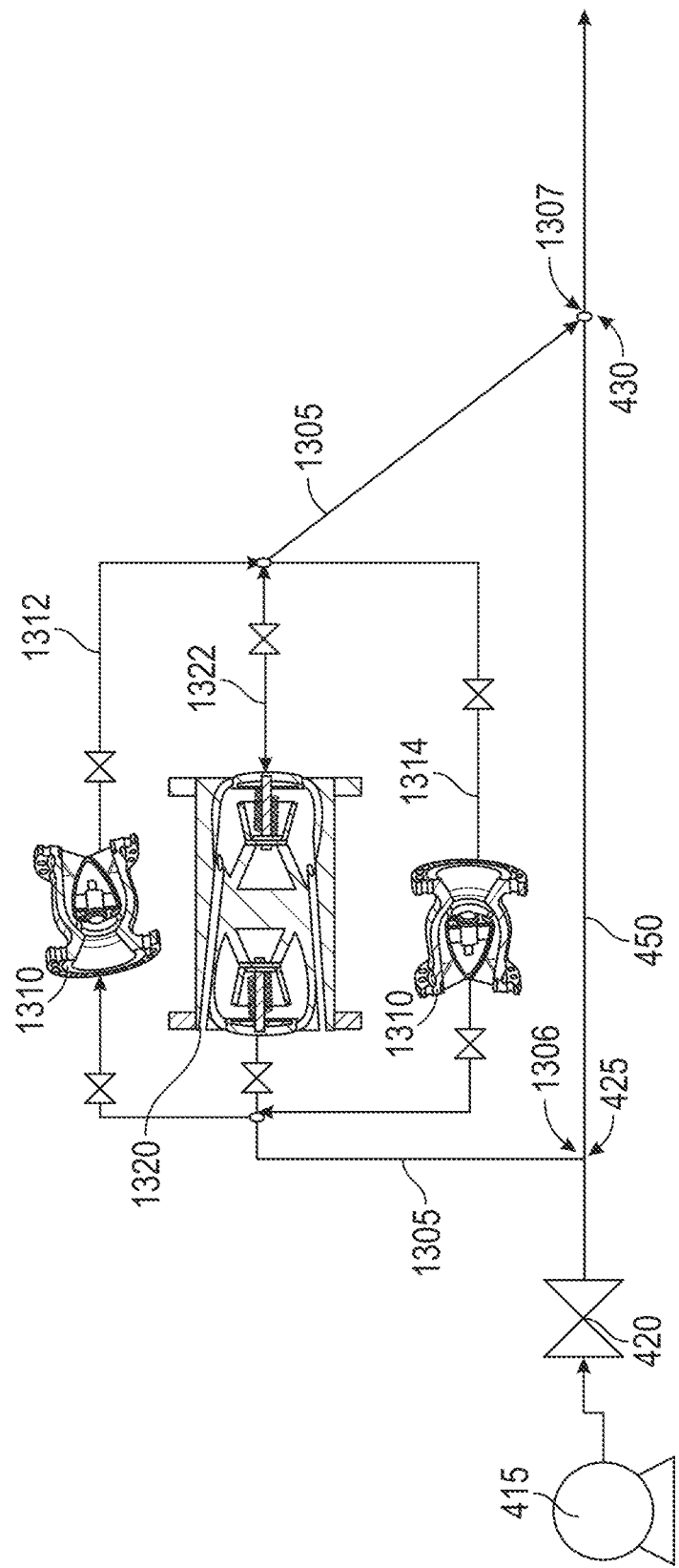
FIG. 13 is a schematic diagram illustrating yet another embodiment of a water hammer mitigation system.

In the embodiment shown in FIGS. 4-7, bi-directional surge relief device 410 is illustrated as being a passive dual surge relief valve. However, in another embodiment, bi-directional surge relief device 410 may be another type of passive bi-directional surge relief device (e.g., including one or more check valves (FIGS. 11-12)). In yet another embodiment, bi-directional surge relief device 410 may be an active bi-directional surge relief device (e.g., including one or more of a control valve, a pressure control valve, a control unit, a pressure sensor, a valve actuator, and the like (FIGS. 8-10); active dual surge relief device). In yet another embodiment, branch connection 405 may be installed with a plurality of (active or passive) bi-directional surge relief devices (FIG. 13). For example, although FIGS. 4-7 illustrate an embodiment where relief valves 515A and 515B of dual surge relief valve 500 are passive valves operated on by spring loaded biasing members 521A and 521B, this may not necessarily be the case. In an alternate embodiment, one or both of relief valves 515A and 515B may be active valves that are operated on by a corresponding actuator and controlled by a control unit (similar to those described in connection with FIG. 8 below) based on measured differential pressure data (measured by a pressure sensor) and corresponding threshold pressure data to move relief valves 515A and/or 515B between the closed and open configurations as described above. In FIGS. 8-13, components having configuration or operation that is the same as or similar to components previously described above are represented with the same reference numerals and therefore, detailed description thereof is omitted here.

Figure 8:
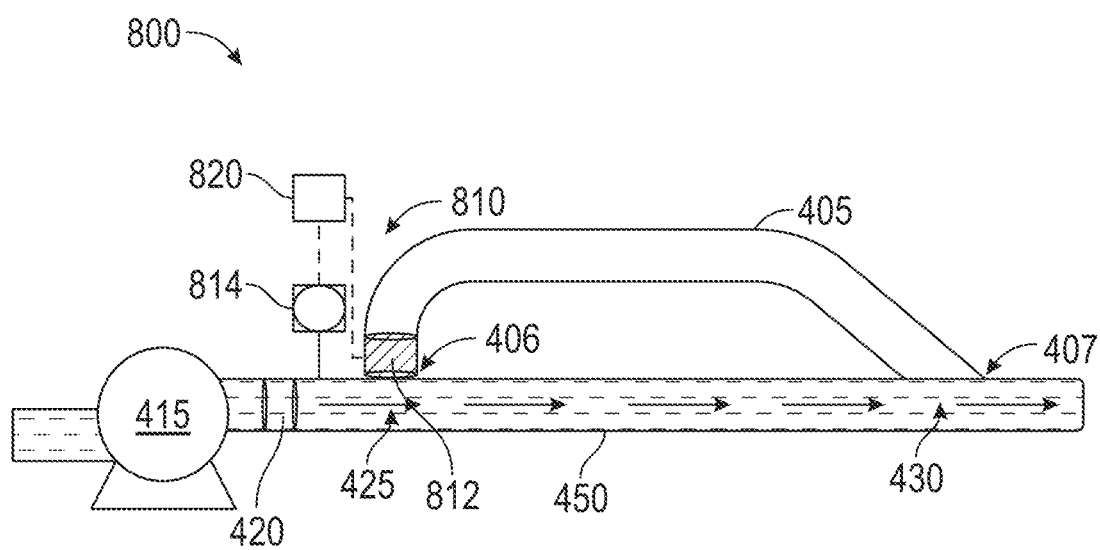
FIG. 8 is a schematic diagram illustrating another embodiment of a water hammer mitigation system utilizing a branch connection and a bi-directional surge relief device.
Figure 9:
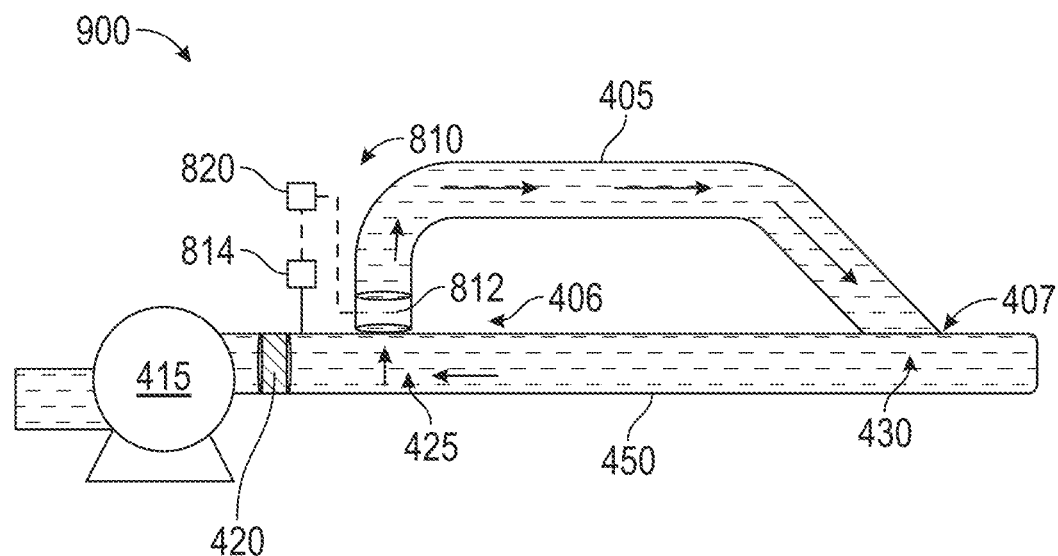
FIG. 9 is a schematic diagram illustrating fluid flow during the high surge pressure mitigation operation of the water hammer mitigation system in accordance with one or more embodiments.

FIG. 8 is a schematic diagram illustrating water hammer mitigation system 800 utilizing branch connection 405 and bi-directional surge relief device 810 in accordance with one or more embodiments. FIG. 9 is a schematic diagram illustrating pipeline fluid flow through branch connection 405 during high or surge pressure mitigation operation in accordance with one or more embodiments. Like in the system of FIG. 4, branch pipeline 405 and bi-directional surge relief device 810 are designed to mitigate and avoid abnormal high (surge) and low (vacuum) pressure in main line 450 by allowing the liquid to flow through branch pipeline 405 when the pressure at surge point 425 reaches abnormal pressure that is outside the allowable pipeline design pressure range corresponding to predefined first and second thresholds. Control valve 812 of bi-directional surge relief device 810 in FIG. 8 is illustrated as being installed in the flow path of branch connection 405 adjacent to first end 406 thereof. However, the location where control valve 812 is installed on branch pipe 405 is not intended to be limiting. For example, control valve 812 may be installed in the flow path at any location along branch pipe 405 between first end 406 and second end 407 thereof.

Bi-directional surge relief device 810 is an active surge relief device that is installed on branch pipeline 405. By operating bi-directional surge relief device 810, system 800 is capable of reducing the magnitude of shock pressure waves associated with the water hammer phenomenon in the liquid pipeline system. That is, by selectively opening and closing fluid flow through branch channel 405 based on surge pressure or high pressure reaching a first predetermined (surge) threshold pressure, bi-directional surge relief device 810 enables relief of high surge pressure 5-100 feet away from surge point 425 at distal point 430 of main pipeline 450. Similarly, by selectively opening fluid flow through branch channel 405 based on low or vacuum pressure reaching a second predetermined (vacuum) threshold pressure, bi-directional surge relief device 810 enables relief of excessive vacuum pressure by filling the vacuum at surge point 425 by flowing pipeline fluid from distal point 430 of main pipeline 450 via branch pipe 405. Active bi-directional surge relief device 810 may include control valve 812, pressure sensor 814, and control unit 820. Although not shown in FIGS. 8-9, surge relief device 810 may also include a valve actuator to actuate or move control valve 812 between fully open and fully closed configurations, and any number of intermediate configurations therebetween. Control unit 820 may be implemented on a computer system that is the same as or similar to computer system 1500 described with regard to at least FIG. 15.

Pressure sensor 814 may include one or more sensors disposed in a flow path of main pipeline 450 and/or a flow path of branch pipe 405 to measure pressure data. For example, pressure sensor 814 may include one or more pressure sensors to determine a differential pressure, a pressure gauge, pressure transducer, and the like. The type, number, or location of pressure sensor 814 is not intended to be limiting so long as the intended functionality of bi-directional surge relief device 810 as described herein can be realized. In FIG. 8, pressure sensor 814 is disposed adjacent or proximal to surge component 420, and may be configured to measure pressure sensor data indicating high or surge pressure at surge point 425, and/or measure pressure sensor data indicating low or vacuum pressure at surge point 425.

Control valve 812 may be a valve used to control pipeline fluid flow through branch pipe 405 (either in a forward direction from first end 406 to second end 407, or in a reverse direction from second end 407 to first end 406) by varying a size of an opening of control valve 812 using a valve actuator (not shown) and under control via a control signal from control unit 820. Control valve 812 may thus enable direct control of a flow rate of the pipeline fluid that can flow through branch pipe 405. Control valve 812 may be selectively movable by the valve actuator and control unit 820 between at least two distinct configurations including a closed configuration (FIG. 8) and an open configuration (FIG. 9). In the closed configuration, control valve 812 is closed and completely prohibits the pipeline fluid, which is flowing through main pipeline 450, from flowing through branch pipe 405. In the open configuration, control valve 812 is at least partially open and permits the pipeline fluid to flow therethrough and through branch pipe 405 in either the forward direction (FIG. 9) or reverse direction (not shown) based on pressure of the pipeline fluid in main pipeline 450 detected by pressure sensor 814.

During normal operation, the valve actuator of control valve 812 may be operable by control unit 820 to maintain control valve 812 in the closed configuration until the (surge or vacuum) pressure measured by pressure sensor 814 reaches the pre-selected first (high or surge) threshold pressure or the pre-selected second (low or vacuum) threshold pressure. Control unit 820 is configured to control the valve actuator of control valve 812 to maintain the closed configuration when the pressure sensed by pressure sensor 814 is within the predetermined allowable design pressure range defined by the pre-selected second (or low/vacuum) threshold pressure and the pre-selected first (high or surge) threshold pressure.

Control unit 820 is further configured to control the valve actuator of control valve 812 to move between the closed configuration and the open configuration in response to the pressure measured by sensor 814 falling outside the predetermined allowable design pressure range. That is, when the surge or high pressure reaches the pre-selected first (high or surge) threshold pressure, control unit 820 controls the valve actuator to move control valve 812 from the closed configuration to the open configuration. As the pressure increases beyond the pre-selected first threshold pressure, control unit 820 controls to open control valve 812 in a proportional manner, thereby allowing increasing flow rate of the pipeline fluid to flow through branch connection 405 in a proportional manner. Thus, control unit 820 is responsive to the surge pressure or high pressure at surge point 425 to adjust a size of the opening of control valve 812 to allow pipeline fluid to flow from first end 406 to second end 407 of branch pipe 405 via the controlled opening of control valve 812. Similarly, as shown in FIG. 9, when the vacuum pressure reaches the pre-selected second (low or vacuum) threshold pressure, control unit 820 controls the valve actuator to move control valve 812 from the closed configuration to the open configuration. As the vacuum pressure increases beyond the pre-selected second threshold pressure, control unit 820 controls to open control valve 812 in a proportional manner, thereby allowing an increasing flow rate of the pipeline fluid to flow through branch connection 405 in a proportional manner. Thus, control unit 820 is responsive to the vacuum pressure or low pressure at surge point 425 to adjust a size of the opening of control valve 812 to allow pipeline fluid to flow from second end 407 to first end 406 of branch pipe 405 via the controlled opening of control valve 812.

With water hammer mitigation system 800 of FIGS. 8-9 where main pipeline 450 is equipped with branch pipe 405 to loop surge pressure internally, where branch pipe 405 is equipped with active surge relief device 810, abnormal pressure conditions corresponding to high or surge pressure exceeding a first threshold and the low or vacuum pressure exceeding a second threshold can be mitigated to acceptable pressure levels that are within the predetermined pipeline design pressure range of the pipeline system. More specifically, upon occurrence of the operation upset scenario at the surge component (e.g., shutdown valve 420 suddenly closed, pump 415 trips, and the like), pipeline fluid flowing through main pipeline 450 will continue to flow as a result of the fluid being still in motion, thereby generating vacuum pressure or vapor column collapse pressure at surge point 425. Control unit 820 will control pressure sensor 814 to measure this vacuum pressure at surge point 425 and compare the measured pressure data with the preset second (low or vacuum) pressure threshold. In response to determining that the measured vacuum pressure has reached the preset vacuum pressure threshold (i.e., measured vacuum pressure falling below the vacuum design pressure limit of the pipeline), control unit 820 may control the valve actuator to open control valve 812 and thereby allow the pipeline fluid to flow through control valve 812 from second end 407 of branch pipe 405 to first end 406, and fill the vacuum created at surge point 425 with the fluid being driven in the reverse direction by the pressure difference in the system, thereby diminishing the magnitude of (or mitigating) the vacuum pressure acting on main pipeline 450 at surge point 425.

Conversely, as a result of the pressure wave, when the downstream pipeline fluid flows back toward surge point 425 at a high velocity and hits the closed surge component (e.g., closed valve or pump 420), causing a rapid spike in high or surge pressure at surge point 425, the fluid pressure at surge point 425 will rapidly spike (FIG. 9). Control unit 820 will control pressure sensor 814 to measure this high or surge spike pressure at surge point 425 and compare the measured pressure data with the preset first (high or surge) pressure threshold. In response to determining that the measured surge pressure has reached the preset first or surge pressure threshold, control unit 820 may control the valve actuator to open control valve 812 and allow the pipeline fluid at surge point 425 to directly pass through branch pipeline 405 (FIG. 9), flow through control valve 812 from first end 406 to second end 407, and be driven back to the main pipeline 450 at distal point 430, thereby diminishing the magnitude of (or mitigating) the high surge pressure acting on main pipeline 450 at surge point 425. Thus, since pipeline fluid at surge point 425 during the high surge pressure operation begins to move downstream in a loop via branch pipe 405 without stoppage of the fluid flow in the main pipeline 450 at the surge point 425, the magnitude of the high surge pressure (or spike) is mitigated, and as a result, the pressure wave reverberating through the pipeline 450 can be quickly and easily moderated and stabilized.

The embodiment shown in FIGS. 8-9 illustrates a single control valve 812 being operated by control unit 820 to allow flow in both forward and reverse directions through branch pipe 405. Alternately, branch pipe 405 may include multiple branch channels, with a control valve separately installed on each branch channel regulate pipeline fluid flow in a single direction so that a first branch channel and corresponding control valve may be controlled to allow or prohibit pipeline fluid flow from first end 406 to second end 407 of branch pipe 405, and a second branch channel and corresponding control valve may be controlled to allow or prohibit pipeline fluid flow from second end 407 to first end 406 of branch pipe 405. As explained previously, main pipeline 450 may be determined to have multiple surge points 425, and branch pipe 405 is equipped with active surge relief device 810 may be separately provided for each surge point.

Figure 10:
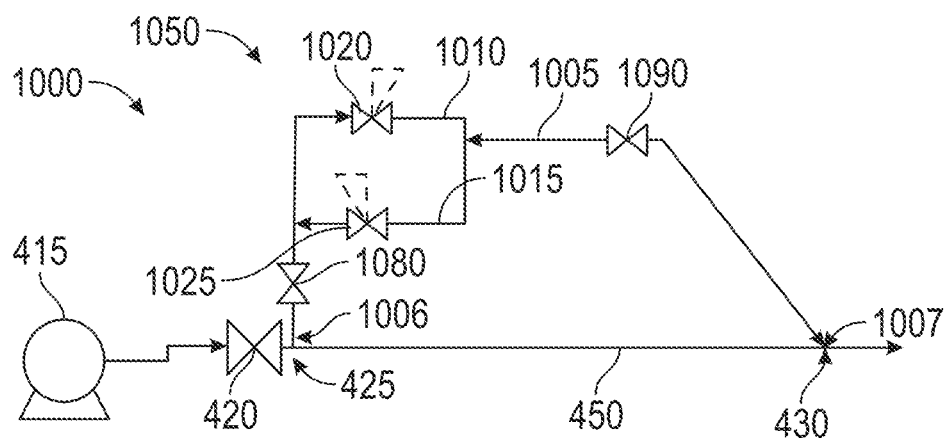
FIG. 10 is a schematic diagram illustrating yet another embodiment of a water hammer mitigation system.

FIG. 10 is a schematic diagram illustrating water hammer mitigation system 1000 utilizing branch connection 1005 and bi-directional surge relief device 1050 in accordance with one or more embodiments Like previous embodiments of the present disclosure, branch pipeline 1005 and bi-directional surge relief device 1050 are designed to mitigate and avoid abnormal high and low pressures in main line 450 by allowing the liquid to flow through the branch pipeline 1005 when the pressure at surge point 425 reaches abnormal (high or low) pressure that is outside the allowable pipeline design pressure range. In FIG. 10, bi-directional surge relief device 1050 is an active surge relief device that is installed on branch pipeline 1005. By operating bi-directional surge relief device 1050, system 1000 is capable of reducing the magnitude of the shock pressure waves associated with the liquid water hammer phenomenon in the liquid pipeline system.

Active bi-directional surge relief device 1050 includes first pressure control valve (PCV) 1020 and second PCV 1025. As shown in FIG. 10, first PCV 1020 is disposed on branch channel 1010 of branch pipeline 1005, and second PCV 1025 is disposed on branch channel 1015 of branch pipeline 1005. Although not shown in FIG. 10, first and second PCVs 1020 and 1025 may also include respective actuators to actuate or move first and second PCVs 1020 and 1025 between fully open and fully closed configurations, and any number of intermediate configurations therebetween. Each PCV 1020, 1025 is designed to selectively permit or restrict flow of the pipeline fluid through the corresponding branch channel 1010, 1015 in one direction. That is, as shown in FIG. 10, first PCV 1020 on branch channel 1010 selectively permits fluid flow from first end 1006 of branch pipeline 1005 coupled to surge point 425 to second end 1007 coupled to distal point 430, via branch channel 1010. Second PCV 1025 disposed on branch channel 1015 selectively permits fluid flow from second end 1007 to first end 1006, via branch channel 1015. Further, although not shown in FIG. 10, first PCV 1020 may include a pressure sensor disposed at an upstream end thereof on a side of first end 1006, and second PCV 1025 may include a second pressure sensor disposed at an upstream end thereof on a side of second end 1007.

By selectively permitting fluid flow through branch connection 1005, and branch channel 1010, based on surge pressure or high pressure at the upstream end of first PCV 1020 reaching a first predetermined threshold pressure, bi-directional surge relief device 1050 enables relief of high surge pressure 5-100 feet away from surge point 425 to distal point 430 on main pipeline 450. Similarly, by selectively allowing fluid flow through branch connection 1005, and branch channel 1015, based on (low or vacuum) pressure at the upstream end of second PCV 1025 reaching a second predetermined threshold pressure, bi-directional surge relief device 1050 enables relief of vacuum pressure by filling the vacuum at the surge point 425 with pipeline fluid from distal point 430 on main pipeline 450. The first (or high or surge) threshold pressure and the second (or low or vacuum) threshold pressures may be predetermined by performing a full surge analysis study (e.g., using commercially available software like SPS or Synergi) of the pipeline system, and PCVs 1020 and 1025 may be set respectively based on the first and second threshold pressures to move from the closed to the open configurations.

During normal operation, first PCV 1020 and second PCV 1025 may be operable to maintain the closed configuration that does not permit pipeline fluid to pass through branch pipe 1005 in either forward or reverse directions until the pressure measured by the pressure sensor disposed upstream of first PCV 1020 reaches the pre-selected first (high or surge) threshold pressure, or until the pressure measured by the pressure sensor disposed upstream of second PCV 1025 reaches the pre-selected second (low or vacuum) threshold pressure. When the pressure measured by the pressure sensor disposed upstream of first PCV 1020 reaches the pre-selected first (high or surge) threshold pressure, first PCV 1020 is operable to move from the closed configuration to the (first) open configuration. As the pressure increases beyond the pre-selected first threshold pressure, first PCV 1020 is operable to open in a proportional manner, thereby allowing an increasing flow rate of the pipeline fluid to flow through branch pipe 1005 and branch channel 1010 in a proportional manner. Thus, surge relief device 1050 is responsive to the surge pressure or high pressure at surge point 425 by adjusting a size of the opening of first PCV 1020 to allow pipeline fluid to flow from first end 1006 to second end 1007 of branch pipe 1005 via channel 1010.

Similarly, when the differential pressure measured by the pressure sensor disposed upstream of second PCV 1025 reaches the pre-selected second (low or vacuum) threshold pressure, second PCV 1025 is operable to move from the closed configuration to the (second) open configuration. As the pressure increases beyond the pre-selected second threshold pressure, second PCV 1025 is operable to open in a proportional manner, thereby allowing an increasing flow rate of the pipeline fluid to flow through branch connection 1005 and branch channel 1015 in a proportional manner. Thus, surge relief device 1050 is responsive to the vacuum pressure or low pressure at surge point 425 by adjusting a size of the opening of second PCV 1025 to allow pipeline fluid to flow from the second end 1007 to first end 1006 of branch pipe 1005 via channel 1015.

As shown in FIG. 10, branch connection 1005 is further equipped with isolation valves 1080 and 1090. Isolation valve 1080 may be installed on a side of first end 1006 of branch connection 1005, and isolation valve 1090 may be installed on a side of second end 1007 of branch connection 1005. Isolation valves 1080 and 1090 may be operable by a control unit (not shown in FIG. 10) to isolate branch connection 1005 from main pipeline 450 during operation. For example, in case maintenance is required on one or more components disposed on branch connection 1005 (e.g., PCV 1020, PCV 1025, branch channel 1010, branch channel 1015, and the like), a control unit may control to move (or an operator may manually move) isolation valves 1080 and 1090 from an open configuration to a closed configuration to prevent any fluid flow through branch connection 1005, while maintaining a normal operation of main pipeline 450. With system 1000 of FIG. 10 equipped with branch pipe 1005 and active surge relief device 1050 to loop internal surge pressure, advantageous effects similar to those described above in connection with FIG. 4-9 can be achieved whereby the abnormal pressure conditions corresponding to the high or surge pressure and the low or vacuum pressure can be mitigated to acceptable pressure levels that are within the predetermined pipeline design pressure range of the pipeline system.

FIG. 11 is a schematic diagram illustrating water hammer mitigation system 1100 utilizing branch connection 1105 and bi-directional surge relief device 1110 in accordance with one or more embodiments Like previous embodiments of water hammer mitigation systems, branch pipeline 1105 and bi-directional surge relief device 1110 are designed to mitigate and avoid abnormal high and low pressures in main line 450 by selectively permitting the liquid to flow through the branch pipeline 1105 when the pressure at surge point 425 reaches abnormal pressure levels outside the allowable pipeline design pressure range. In FIG. 11, bi-directional surge relief device 1110 is a passive surge relief device that is installed on branch pipeline 1105. By operating bi-directional surge relief device 1110, system 1100 is capable of reducing the magnitude of the shock pressure waves associated with the water hammer phenomenon in the liquid pipeline system.

Passive bi-directional surge relief device 1110 includes first check valve 1120 and second check valve 1130. As shown in FIG. 11, first check valve 1120 is disposed on branch channel 1125 of branch pipeline 1105, and second check valve 1130 is disposed on branch channel 1135 of branch pipeline 1105. Configuration and operation of check valves 1120 and 1130 is known to those having ordinary skill in the art, and detailed description thereof is omitted here. Each check valve 1120 and 1130 is designed to selectively permit or restrict flow of the pipeline fluid through the corresponding branch channel 1125 or 1135 in one direction. That is, as shown in FIG. 11, first check valve 1120 on branch channel 1125 selectively permits fluid flow from first end 1106 of branch pipeline 1105 coupled to surge point 425 to second end 1107 coupled to distal point 430, via branch channel 1125. Similarly, second check valve 1130 disposed on branch channel 1135 selectively permits fluid flow from second end 1107 to first end 1106 via branch channel 1135. Check valves 1120 and 1130 may include biasing members (e.g., coil spring) to maintain check valves 1120 and 1130 in the closed configuration during normal operation (e.g., when pressure within predetermined allowable design pressure range of pipeline system).

By selectively permitting fluid flow through branch connection 1105, and branch channel 1125, based on surge pressure or high pressure (e.g., differential pressure) at an upstream end of first check valve 1120 reaching a first predetermined (spring-loaded) threshold pressure, bi-directional surge relief device 1110 enables relief of high surge pressure 5-100 feet away from surge point 425, at distal point 430 on main pipeline 450. Similarly, by selectively permitting fluid flow through branch connection 1105, and branch channel 1135, based on low or vacuum pressure (e.g., differential pressure) at an upstream end of second check valve 1130 reaching a second predetermined (spring-loaded) threshold pressure, bi-directional surge relief device 1110 enables relief of vacuum pressure by filling the vacuum at surge point 425 with pipeline fluid from distal point 430 of main pipeline 450. The first (or high or surge) spring loaded threshold pressure and the second (or low or vacuum) spring loaded threshold pressures may be predetermined by performing a full surge analysis study (e.g., using commercially available software like SPS or Synergi) of the pipeline system, and the biasing members of check valves 1120 and 1130 may be set respectively based on the first and second spring loaded threshold pressures to move from the closed to the open configurations.

In the embodiment shown in FIG. 11, one check valve is disposed for selectively permitting or restricting flow of the pipeline fluid through the branch pipeline in each (forward or reverse) direction. In an alternate embodiment shown in FIG. 12, two check valves are disposed for each direction. That is, as shown in FIG. 12, check valves 1220A and 1220B are disposed on branch channel 1125 to control flow from first end 1106 to second end 1107 of branch pipe 1105, and check valves 1230A and 1230B are disposed on branch channel 1135 to control flow from second end 1107 to first end 1106 of branch pipe 1105. Other components of system 1200 of FIG. 12 are similar to those shown in FIG. 11. With two check valves disposed on respective branch channels to selectively permit or restrict flow in either direction, the first and second spring loaded threshold pressures can be set at higher levels, allowing for a bigger or broader allowable design pressure range for the pipeline system. FIGS. 11 and 12 also show that isolation valves 1080 and 1090 are disposed at first and second ends 1106 and 1107 respectively of branch pipe 1105 for isolating branch pipe 1105 for maintenance. The isolation valves may similarly be installed in other embodiments of the water hammer mitigation systems disclosed herein.

The embodiments shown in each of FIGS. 4 and 8-12 show one bi-directional surge relief device disposed on the branch connection. In an alternate embodiment, two (or more) bi-directional surge relief devices may be disposed on respective branch channels of the branch pipeline to provide redundancy and maintain the surge relief capability of the system in case one of the surge relief devices malfunctions or experiences failure. FIG. 13 is a schematic diagram illustrating water hammer mitigation system 1300 utilizing branch connection 1305, a first bi-directional surge relief device 1310, and a second bi-directional surge relief device 1320 in accordance with one or more embodiments.

In the illustrated embodiment, first bi-directional surge relief device 1310 is a passive surge relief device similar to surge relief device 1110 of FIG. 11, and second bi-directional surge relief device 1320 is a passive surge relief device similar to surge relief device 410 of FIG. 4. In other embodiments, each of the first and second surge relief devices 1310 and 1320 can be any of the (active or passive) surge relief devices described in connection with FIGS. 4 and 8-12, so long as the two devices are of dissimilar types. As shown in FIG. 13, the first and second check valves of first surge relief device 1310 are respectively installed on corresponding branch channels 1312 and 1314 of branch pipeline 1305, and the dual surge relief valve of second bi-directional surge relief device 1320 is installed on branch channel 1322 of branch pipeline 1305. Each of branch channels 1312, 1314, and 1322, are fluidly coupled between first end 1306 and second end 1307 of branch pipeline 1305. The first (or high or surge) spring loaded threshold pressure and the second (or low or vacuum) spring loaded threshold pressure for the check valves of first surge relief device 1310, and the first (or high or surge) spring loaded threshold pressure and the second (or low or vacuum) spring loaded threshold pressure for the dual surge relief valve of the second surge relief device 1320 may be predetermined by performing a full surge analysis study (e.g., using commercially available software like SPS or Synergi) of the pipeline system, and the biasing members of the check valves and the dual surge relief valve may be set accordingly to move from the closed to the open configurations.

Figure 14:
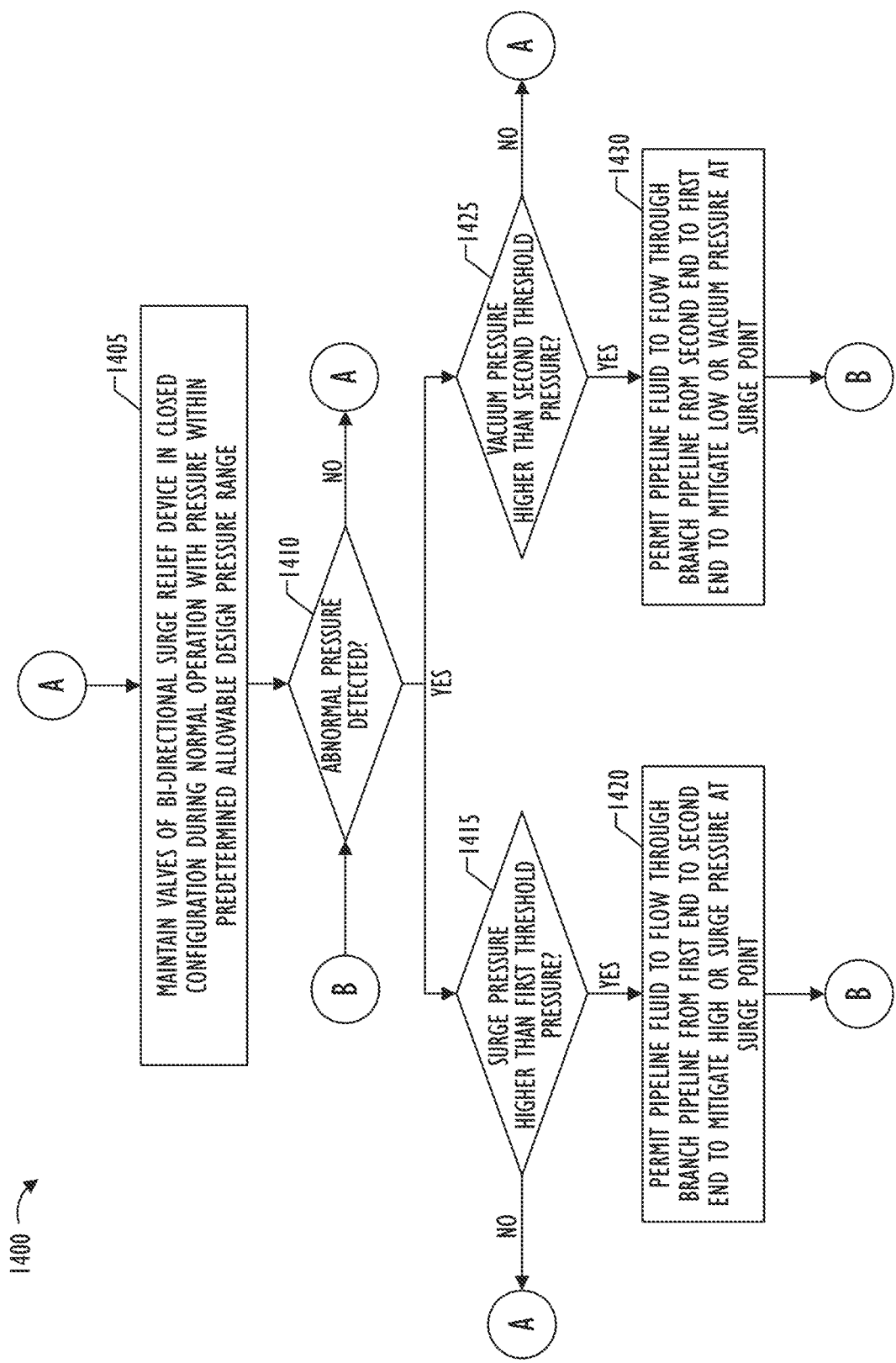
FIG. 14 is a flow chart that illustrates a method of operation of the water hammer mitigation system in accordance with one or more embodiments.

FIG. 14 is a flow chart that illustrates a method of operation of the water hammer mitigation system in accordance with one or more embodiments. Method 1400 begins at block 1405 where the valves of the bi-directional surge relief device (e.g., 410, 810, 1050, 1110, 1210, 1310, 1320, and the like) are maintained in the closed configuration during normal operation in which the pressure of the pipeline fluid is within the predetermined allowable design pressure range. In case the bi-directional surge relief device is a passive device (e.g., 410, 1110, 1210, 1310, 1320), the pressure at block 1405 may correspond to the differential pressure established in the pipeline fluid between upstream and downstream ends of the valve. In case the bi-directional surge relief device is an active device (e.g., 810, 1050), the pressure at block 1405 may correspond to pressure data measured by a pressure sensor disposed at the surge point (or at another location on the main pipeline or on the branch pipeline) where excessive surge pressure (and vacuum pressure) is expected to occur. As explained previously, during the normal operation, valves of the (active or passive) bi-directional surge relief device are configured to maintain the closed configuration in which the pipeline fluid flowing through the main pipeline is prohibited from flowing through the branch connection.

Method then proceeds to block 1410 where it is determined whether abnormal pressure has been detected. As explained previously, the abnormal pressure may occur in the main pipeline when a surge component (e.g., pump, valve, and the like) disposed on the pipeline system suffers an operation upset scenario (e.g., sudden pump trip, power failure, sudden valve closure, and the like) that causes generation of a pressure wave or water hammer in the main pipeline system. Abnormal pressure detection at block 1410 may correspond to a situation where, as a result of the pressure wave, the pressure in the main pipeline at the surge point exceeds a predetermined surge (or first or high) threshold pressure or a situation where, as a result of the pressure wave, the vacuum pressure in the main pipeline at the surge point exceeds a predetermined vacuum (or second or low) threshold pressure. The pressure range defined by the first and second threshold pressure corresponds to the predetermined allowable design pressure range that the pipeline system is rated for while operating safely during normal operation.

If the pressure in the main pipeline goes outside this pressure range (e.g., abnormal (high or low/vacuum) pressure), damage to the pipeline or its components can occur. In case the bi-directional surge relief device is a passive surge relief device, the abnormal pressure detection may be based on the differential pressure established in the pipeline fluid that is acting on the spring loaded passive valves (e.g., dual surge relief valve 500, check valves 1120, 1130, and the like) maintained in the closed configuration. In case the bi-directional surge relief device is an active surge relief device, the abnormal pressure detection at block 1410 may correspond to the pressure sensor of the active surge relief device detecting pressure sensor data indicating the pressure of the pipeline fluid at the surge point, and the control unit comparing the measured pressure with data representing the predetermined first and second threshold pressures to determine whether the measured pressure is within the "normal range" defined by the first and second threshold pressures.

If abnormal pressure is detected (YES at block 1410), method 1400 proceeds to blocks 1415 and 1425 to determine whether the detected abnormal pressure is abnormally high (or surge) pressure, or abnormally low (or vacuum) pressure. That is, at block 1415, method 1400 determines whether the abnormal pressure is in the form of surge (or high) pressure that has become greater than the predetermined first threshold pressure. In case the bi-directional surge relief device is a passive relief device, at least one of the valves of the passive surge relief device may be configured to move from the closed configuration to the open configuration in a proportional manner based on the differential pressure acting on the valve becoming higher than the predetermined first (high or surge) threshold pressure defined by the set point of the spring (YES at block 1415). As a result, at block 1420, the passive valve in the open configuration permits the pipeline fluid at the surge point to flow through the branch pipeline (and any corresponding branch channel thereof) from the first (surge) end to the second (distal) end of the branch pipeline, thereby allowing the pipeline fluid under high pressure at the surge point to be directly relieved through the branch pipeline and driven back to the main line at the distal point, and thereby relieving the high or surge pressure at the surge point.

In case the bi-directional surge relief device is an active device, the control unit at block 1415 determines whether the pressure data from the pressure sensor indicates that the pressure at the surge point has become higher than the preset first threshold pressure. In response to determining that the pressure data from the pressure sensor indicates that the pressure at the surge point has become higher than the preset first threshold pressure (YES at block 1415), the control unit at block 1420 may control a valve actuator to move at least one of the valves of the active surge relief device from the closed configuration to the open configuration in a proportional manner based on the detected pressure to permit the pipeline fluid at the surge point to flow through the branch pipeline (and any corresponding branch channel thereof) from the first (surge) end to the second (distal) end of the branch pipeline, thereby allowing the pipeline fluid under high pressure at the surge point to be directly relieved through the branch pipeline and driven back to the main line at the distal point, and thereby relieving the high or surge pressure at the surge point.

At block 1425, method 1400 determines whether the abnormal pressure is in the form of vacuum (or low) pressure that has become greater than the predetermined second threshold vacuum pressure. In case the bi-directional surge relief device is a passive relief device, at least one of the valves of the passive surge relief device may be configured to move from the closed configuration to the open configuration in a proportional manner based on the differential pressure acting on the valve becoming higher than the corresponding predetermined second (low or vacuum) threshold pressure defined by the set point of the spring (YES at block 1425). As a result, at block 1430, the passive valve in the open configuration permits the pipeline fluid in the main pipeline at the distal point to flow through the branch pipeline (and any corresponding branch channel thereof) from the second (distal) end to the first (surge) end of the branch pipeline, thereby allowing the pipeline fluid to flow in a reverse direction in the branch pipeline as compared to the normal flow direction in the main pipeline, and fill the vacuum in the main line proximal to the surge point where the high vacuum pressure is generated to mitigate the transient or surge pressure wave.

In case the bi-directional surge relief device is an active device, the control unit at block 1425 determines whether the pressure data from the pressure sensor (e.g., disposed at surge point) indicates that the vacuum pressure at the surge point has become higher than the preset second threshold (vacuum) pressure. In response to determining that the pressure data from the pressure sensor indicates that the vacuum pressure at the surge point has become higher than the preset second threshold pressure (YES at block 1425), the control unit at block 1430 may control a valve actuator to move at least one of the valves of the active surge relief device from the closed configuration to the open configuration in a proportional manner based on the pressure data to permit the pipeline fluid in the main pipeline at the distal point to flow through the branch pipeline (and any corresponding branch channel thereof) from the second (distal) end to the first (surge) end of the branch pipeline, thereby allowing the pipeline fluid to flow in a reverse direction in the branch pipeline as compared to the normal flow direction in the main pipeline, and fill the vacuum in the main line proximal to the surge point where the high vacuum pressure is generated to mitigate the transient or surge pressure wave.

After the water hammer mitigation operation at steps 1415-1430, method 1400 returns to block 1410 where the detection of the abnormal pressure condition is performed again and the water hammer mitigation operation of blocks 1415-1430 is repeatedly performed until the high spikes and deep valleys of the pressure wave have normalized to be within the normal pressure range defined by the first and second threshold pressures. If the abnormal (surge or vacuum) pressure is not detected (NO at block 1410, NO at block 1415, or NO at block 1425), method 1400 returns at block 1405 where the bi-directional surge relief device (e.g., 410, 810, 1050, 1110, 1210, 1310, 1320, and the like) remains in the closed configuration (and fluid flow through branch pipeline is prohibited) since the pressure of the pipeline fluid is within the predetermined allowable design pressure range. By implementing method 1400, the pressure wave, that develops in the main pipeline due to the operation upset scenario of the surge component, can be moderated and stabilized rapidly and damage to the pipeline or its components can be prevented.

Figure 15:
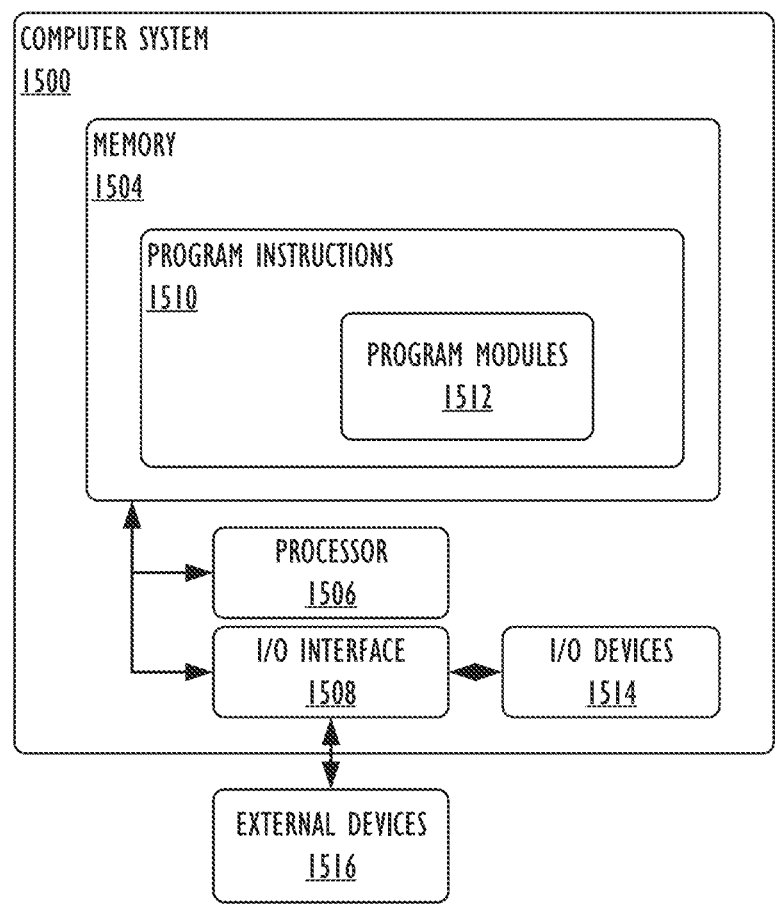
FIG. 15 is a functional block diagram of an exemplary computer system in accordance with one or more embodiments.

FIG. 15 is a functional block diagram of an exemplary computer system (or "system") 1500 in accordance with one or more embodiments. In some embodiments, system 1500 is a PLC, system on a chip, or ASIC. System 1500 may include memory 1504, processor 1506 and input/output (I/O) interface 1508. Memory 1504 may include non-volatile memory (e.g., flash memory, solid state memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), or bulk storage memory (e.g., CD-ROM or DVD-ROM, hard drives). Memory 1504 may include a non-transitory computer-readable storage medium (e.g., non-transitory program storage device) having program instructions 1510 stored thereon. Program instructions 1510 may include program modules 1512 that are executable by a computer processor (e.g., processor 1506) to cause the functional operations described herein, such as those described with regard to control unit of dual surge relief valve 500, control unit 820, or method 1400.

Processor 1506 may be any suitable processor capable of executing program instructions. Processor 1506 may include a central processing unit (CPU) that carries out program instructions (e.g., the program instructions of the program modules 1512) to perform the arithmetical, logical, or input/output operations described. Processor 1506 may include one or more processors. I/O interface 1508 may provide an interface for communication with one or more I/O devices 1514, such as a joystick, a computer mouse, a keyboard, or a display screen (for example, an electronic display for displaying a graphical user interface (GUI)). I/O devices 1514 may include one or more of the user input devices. I/O devices 1514 may be connected to I/O interface 1508 by way of a wired connection (e.g., an Industrial Ethernet connection) or a wireless connection (e.g., a Wi-Fi connection). I/O interface 1508 may provide an interface for communication with one or more external devices 1516. In some embodiments, I/O interface 1508 includes one or both of an antenna and a transceiver. In some embodiments, external devices 1516 include sensors 814, valve actuators (not shown), control valve 812, PCV 1020, 1025, or any other component of the active bi-directional surge relief devices described herein.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

It will be appreciated that the processes and methods described herein are example embodiments of processes and methods that may be employed in accordance with the techniques described herein. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination of software and hardware. Some or all of the portions of the processes and methods may be implemented by one or more of the processors/modules/applications described here.

As used throughout this application, the word "may" is used in a permissive sense (e.g., meaning having the potential to), rather than the mandatory sense (e.g., meaning must). The words "include," "including," and "includes"

mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (e.g., by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise.

Many other embodiments will be apparent to those of skill in the art upon reviewing the above description. The scope of the subject matter of the present disclosure therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A water hammer mitigation system, comprising:
   a branch connection with a first end fluidly coupled to a main pipeline at a surge point on the main pipeline and a second end fluidly coupled to the main pipeline at a distal point on the main pipeline that is distal to the surge point;
   a shutdown valve in the main pipeline that is downstream of a pressure source and upstream of the branch connection; and
   a bi-directional surge relief device disposed on the branch connection and that comprises,
      a housing with a first end proximate the branch connection first end and a second end proximate the branch connection second end,
      a first cavity in the housing adjacent the housing first end and a second cavity in the housing adjacent the housing second end,
      a first flow channel extending through the housing between the first cavity and the housing second end,
      a second flow channel extending through the housing between the second cavity and the housing first end,
      a first relief valve in the first cavity that is moveable into a first open configuration when a pressure differential across the relief device exceeds a first predetermined threshold pressure and so that the housing first and second ends are in fluid communication through the first flow channel and first cavity, and
      a second relief valve in the second cavity that is moveable into a second open configuration when a pressure differential across the relief device exceeds a second predetermined threshold pressure and so that the housing first and second ends are in fluid communication through the second flow channel and second cavity.

2. The water hammer mitigation system according to claim 1, wherein the pressure source comprises a pump.

3. The water hammer mitigation system according to claim 2, wherein closing the shutdown valve at the same time the pump is operating creates a pressure differential across the relief device that is at or above the second predetermined threshold pressure.

4. The water hammer mitigation system according to claim 2, wherein the surge point is adjacent to the shutdown valve on the main pipeline.

5. The water hammer mitigation system according to claim 2, wherein the branch connection is a pipeline having a pipe diameter substantially in the range of 1-8 inches, and a pipeline length substantially in the range of 5-100 feet, and
wherein the first end of the branch connection is fluidly coupled to the main pipeline at the surge point substantially at a right angle, and the second end of the branch connection is fluidly coupled to the main pipeline at the distal point at an inclined angle.

6. The water hammer mitigation system according to claim 2, wherein
the first relief valve comprises a first closure member that is operable to move into and out of contact with a surge seat to move the first relief valve between a closed configuration prohibiting fluid from flowing through the branch connection, and the first open configuration permitting fluid to flow through the branch connection from the first end to the second end; and
the second relief valve comprises a second closure member that is operable to move into and out of contact with a vacuum seat to move the second relief valve between a closed configuration and the second open configuration permitting fluid to flow through the branch connection from the second end to the first end.

7. The water hammer mitigation system according to claim 6, wherein:
the first relief valve comprises a first biasing member operable to maintain the first relief valve in the closed configuration when a pressure differential across the relief device acting on the first closure member is below the first predetermined threshold pressure, and operable to move the first relief valve from the closed configuration to the first open configuration when the pressure differential across the relief device acting on the first closure member reaches the first predetermined threshold pressure; and
the second relief valve comprises a second biasing member operable to maintain the second relief valve in the closed configuration when a pressure differential across the relief device acting on the second closure member is below the second predetermined threshold pressure, and operable to move the second relief valve from the closed configuration to the second open configuration when the pressure differential across the relief device acting on the second closure member reaches the second predetermined threshold pressure,
wherein the pressure differential across the relief device acting on the first closure member corresponds to a surge pressure at the surge point on the main pipeline, and the pressure differential across the relief device acting on the second closure member corresponds to a vacuum pressure at the surge point on the main pipeline.

8. The water hammer mitigation system according to claim 7, wherein the first and second biasing members are spring loaded biasing members, and
wherein the first predetermined threshold pressure is defined by a set point of a coil spring of the first biasing member, and the second predetermined threshold pressure is defined by a set point of a coil spring of the second biasing member.

9. The water hammer mitigation system according to claim 7, wherein each of the first and second biasing members is an active biasing member actuated by an actuator and controlled by a control unit based on pressure sensor data, and wherein the control unit is configured to:
actuate the first and second biasing members to maintain the closed configuration based on a comparison of the pressure data indicating the pressure at the surge point and data representing a predetermined surge pressure threshold and a predetermined vacuum pressure threshold indicating that the surge pressure at the surge point is less than the predetermined surge pressure threshold, and the vacuum pressure at the surge point is less than the predetermined vacuum pressure threshold, wherein the first predetermined threshold pressure across the relief device corresponds to the predetermined surge pressure threshold at the surge point, and wherein the second predetermined threshold pressure across the relief device corresponds to the predetermined vacuum pressure threshold at the surge point;
actuate the first biasing member to move the first relief valve to the first open configuration in response to the comparison indicating that the surge pressure at the surge point has reached the predetermined surge pressure threshold; and
actuate the second biasing member to move the second relief valve to the second open configuration in response to the comparison indicating that the vacuum pressure at the surge point has reached the predetermined vacuum pressure threshold.

10. The water hammer mitigation system according to claim 2, wherein:
the branch connection includes a first branch channel and a second branch channel between the first and second ends,
the bi-directional surge relief device is disposed on the first branch channel, and
the water hammer mitigation system further includes a second bi-directional surge relief device that is disposed on the second branch channel.

11. A water hammer mitigation method comprising:
flowing fluid through a main pipeline, the main pipeline in communication with a pressure source, the main pipeline having a shutdown valve downstream of the pressure source, and first and second ends of a branch pipeline coupled to the main pipeline, the branch pipeline having a bi-directional surge relief device between the first and second ends;
the bi-directional surge relief device comprising
a housing with a first end proximate the branch pipeline first end and a second end proximate the branch pipeline second end,
a first cavity in the housing adjacent the housing first end and a second cavity in the housing adjacent the housing second end,
a first flow channel extending through the housing between the first cavity and the housing second end,
a second flow channel extending through the housing between the second cavity and the housing first end,
a first relief valve in the first cavity that is moveable into a first open configuration when a pressure differential across the relief device exceeds a first predetermined threshold pressure and so that the housing first and second ends are in fluid communication through the first flow channel and the first cavity, and
a second relief valve in the second cavity that is moveable into a second open configuration when a pressure differential across the relief device exceeds a second predetermined threshold pressure and so that the housing first and second ends are in fluid communication through the second flow channel and the second cavity;

maintaining the bi-directional surge relief device in a closed configuration to prohibit fluid flowing in the main pipeline from flowing through the branch pipeline in response to pressure at a surge point on the main pipeline being between a predetermined vacuum pressure threshold and a predetermined surge pressure threshold, wherein the first predetermined threshold pressure across the relief device corresponds to the predetermined surge pressure threshold at the surge point, and wherein the second predetermined threshold pressure across the relief device corresponds to the predetermined vacuum pressure threshold at the surge point, wherein the first end of the branch pipeline is fluidly coupled to the main pipeline at the surge point on the main pipeline and the second end of the branch pipeline is fluidly coupled to the main pipeline at a distal point on the main pipeline that is distal to the surge point;

operating the bi-directional surge relief device to move the first relief valve to the first open configuration to permit fluid flowing through the main pipeline to flow via the branch pipeline from the first end to the second end and into the main pipeline via the distal point, in response to the pressure at the surge point on the main pipeline reaching the predetermined surge pressure threshold; and operating the bi-directional surge relief device to move the second relief valve to the second open configuration to permit fluid flowing through the main pipeline to flow via the branch pipeline from the second end to the first end and into the main pipeline via the surge point, in response to the pressure at the surge point on the main pipeline reaching the predetermined vacuum pressure threshold.

12. The water hammer mitigation method according to claim 11, wherein a flow path for fluid flowing from the first end to the second end of the branch pipeline when the first relief valve is in the first open configuration is different from a flow path for fluid flowing from the second end to the first end of the branch pipeline when the second relief valve is in the second open configuration.

\* \* \* \* \*